(12) United States Patent
Faber et al.

(10) Patent No.: US 7,698,183 B2
(45) Date of Patent: Apr. 13, 2010

(54) METHOD AND APPARATUS FOR PRIORITIZING A LISTING OF INFORMATION PROVIDERS

(75) Inventors: Scott Faber, San Francisco, CA (US); Ron Hirson, San Francisco, CA (US); Henrik Axel Ebbe Altberg, Mill Valley, CA (US); Sean David Van der Linden, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 1673 days.

(21) Appl. No.: 10/465,770

(22) Filed: Jun. 18, 2003

(65) Prior Publication Data

US 2005/0119957 A1 Jun. 2, 2005

(51) Int. Cl.
*G06Q 40/00* (2006.01)
(52) U.S. Cl. ....................... 705/35; 705/36 R
(58) Field of Classification Search ............ 705/8, 705/35–36 R
See application file for complete search history.

(56) References Cited

U.S. PATENT DOCUMENTS

| | | | |
|---|---|---|---|
| 4,313,035 A | 1/1982 | Jordan et al. |
| 4,577,065 A | 3/1986 | Frey et al. |
| 4,604,686 A | 8/1986 | Reiter et al. |
| 4,631,428 A | 12/1986 | Grimes |
| 4,645,873 A | 2/1987 | Chomet |
| 4,677,434 A | 6/1987 | Fascenda |
| 4,677,659 A | 6/1987 | Dargan |
| 4,723,283 A | 2/1988 | Nagasawa et al. |
| 4,741,025 A | 4/1988 | Maruyama et al. |
| 4,751,669 A | 6/1988 | Sturgis et al. |
| 4,752,675 A | 6/1988 | Zetmeir |
| 4,757,267 A | 7/1988 | Riskin |
| 4,796,293 A | 1/1989 | Blinken et al. |
| 4,817,129 A | 3/1989 | Riskin |
| 4,847,890 A | 7/1989 | Solomon et al. |
| 4,878,239 A | 10/1989 | Solomon et al. |
| 4,969,185 A | 11/1990 | Dorst et al. |

(Continued)

FOREIGN PATENT DOCUMENTS

AU 699785 5/1995

(Continued)

OTHER PUBLICATIONS

U.S. Appl. No. 09/596,466, filed Jun. 19, 2000, Agdeppa, Hector A.

(Continued)

*Primary Examiner*—Thu Thao Havan
(74) *Attorney, Agent, or Firm*—Greenberg Traurig, LLP

(57) ABSTRACT

A method and apparatus for prioritizing a listing of information providers according to a fee value and availability status indicated for the information providers, and providing a set of one or more information provider identifiers that satisfy a request for a type of information provider that has been received from a user over the Internet. The set of information provider identifiers are ranked according to their associated fee values and availability status. A set of one or more files are generated to display the set of information provider identifiers. The set of files are transmitted to the user, and the user is provided access to an information provider identified by one of the set of information provider identifiers.

25 Claims, 13 Drawing Sheets

U.S. PATENT DOCUMENTS

| | | |
|---|---|---|
| 5,018,094 A | 5/1991 | Fischer et al. |
| 5,058,152 A | 10/1991 | Solomon et al. |
| 5,099,510 A | 3/1992 | Blinken, Jr. et al. |
| 5,148,474 A | 9/1992 | Haralambopoulos et al. |
| 5,155,743 A | 10/1992 | Jacobs |
| 5,155,761 A | 10/1992 | Hammond |
| 5,182,769 A | 1/1993 | Yamaguchi et al. |
| 5,206,903 A | 4/1993 | Kohler et al. |
| 5,319,542 A | 6/1994 | King, Jr. et al. |
| 5,325,424 A | 6/1994 | Grube |
| 5,339,358 A | 8/1994 | Danish et al. |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,373,549 A | 12/1994 | Bales et al. |
| 5,436,957 A | 7/1995 | McConnell |
| 5,448,625 A | 9/1995 | Lederman |
| 5,453,352 A | 9/1995 | Tachibana |
| 5,459,779 A | 10/1995 | Backaus et al. |
| 5,469,497 A | 11/1995 | Pierce et al. |
| 5,483,352 A | 1/1996 | Fukuyama et al. |
| 5,483,588 A | 1/1996 | Eaton et al. |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,539,813 A | 7/1996 | Jonsson |
| 5,544,237 A | 8/1996 | Bales et al. |
| 5,555,298 A | 9/1996 | Jonsson |
| 5,557,677 A | 9/1996 | Prytz |
| 5,559,875 A | 9/1996 | Bieselin et al. |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,604,803 A | 2/1997 | Aziz |
| 5,608,786 A | 3/1997 | Gordon |
| 5,615,213 A | 3/1997 | Griefer |
| 5,619,148 A | 4/1997 | Guo |
| 5,619,555 A | 4/1997 | Fenton et al. |
| 5,619,570 A | 4/1997 | Tsutsui |
| 5,619,725 A | 4/1997 | Gordon |
| 5,619,991 A | 4/1997 | Sloane |
| 5,623,536 A | 4/1997 | Solomon et al. |
| 5,634,012 A | 5/1997 | Stefik et al. |
| 5,638,432 A | 6/1997 | Wille et al. |
| 5,644,715 A | 7/1997 | Baugher |
| 5,651,058 A | 7/1997 | Hackett-Jones et al. |
| 5,659,742 A | 8/1997 | Beattie et al. |
| 5,668,953 A | 9/1997 | Sloo |
| 5,675,734 A | 10/1997 | Hair |
| 5,689,553 A | 11/1997 | Ahuja et al. |
| 5,694,163 A | 12/1997 | Harrison |
| 5,694,537 A | 12/1997 | Montenegro et al. |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,724,521 A | 3/1998 | Dedrick |
| 5,734,961 A | 3/1998 | Castille |
| 5,740,231 A | 4/1998 | Cohn et al. |
| 5,740,549 A | 4/1998 | Reilly et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,794,210 A | 8/1998 | Goldhaber et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kania et al. |
| 5,835,896 A | 11/1998 | Fisher et al. |
| 5,841,763 A | 11/1998 | Leondires et al. |
| 5,842,212 A | 11/1998 | Ballurio et al. |
| 5,845,265 A | 12/1998 | Woolston |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,903,877 A | 5/1999 | Berkowitz et al. |
| 5,907,077 A | 5/1999 | Glenn et al. |
| 5,907,677 A | 5/1999 | Glenn et al. |
| 5,911,132 A | 6/1999 | Sloane |
| 5,914,951 A | 6/1999 | Bentley et al. |
| 5,915,214 A | 6/1999 | Reece et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,943,422 A | 8/1999 | Van Wie et al. |
| 5,946,646 A | 8/1999 | Schena et al. |
| 5,948,054 A | 9/1999 | Nielsen |
| 5,960,416 A | 9/1999 | Block |
| 5,974,141 A | 10/1999 | Saito |
| 5,974,398 A | 10/1999 | Hanson et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,006,197 A | 12/1999 | d-Eon et al. |
| 6,011,794 A | 1/2000 | Mordowitz et al. |
| 6,014,439 A | 1/2000 | Walker et al. |
| 6,014,644 A | 1/2000 | Erickson |
| 6,016,478 A | 1/2000 | Zhang et al. |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |

| | | | |
|---|---|---|---|
| 6,055,513 A | 4/2000 | Katz et al. | |
| 6,058,379 A | 5/2000 | Odom et al. | |
| 6,064,978 A | 5/2000 | Gardener et al. | |
| 6,067,561 A | 5/2000 | Dillon | |
| 6,078,866 A | 6/2000 | Buck et al. | |
| 6,108,493 A | 8/2000 | Miller et al. | |
| 6,130,933 A | 10/2000 | Miloslavsky | |
| 6,131,085 A | 10/2000 | Rossides | |
| 6,144,670 A | 11/2000 | Sponaugle et al. | |
| 6,167,379 A | 12/2000 | Dean et al. | |
| 6,167,449 A | 12/2000 | Arnold et al. | |
| 6,173,279 B1 | 1/2001 | Levin et al. | |
| 6,175,619 B1 | 1/2001 | DeSimone | |
| 6,185,194 B1 | 2/2001 | Musk et al. | |
| 6,185,289 B1 | 2/2001 | Hetz et al. | |
| 6,188,673 B1 | 2/2001 | Bauer et al. | |
| 6,188,761 B1 | 2/2001 | Dickerman et al. | |
| 6,192,050 B1 | 2/2001 | Stovall | |
| 6,199,096 B1 | 3/2001 | Mirashrafi et al. | |
| 6,212,192 B1 | 4/2001 | Mirashrafi et al. | |
| 6,212,268 B1 | 4/2001 | Nielsen | |
| 6,216,111 B1 | 4/2001 | Walker et al. | |
| 6,223,165 B1 * | 4/2001 | Lauffer | 705/8 |
| 6,230,287 B1 | 5/2001 | Pinard et al. | |
| 6,233,566 B1 * | 5/2001 | Levine et al. | 705/36 R |
| 6,243,684 B1 | 6/2001 | Stuart et al. | |
| 6,246,875 B1 | 6/2001 | Seazholtz et al. | |
| 6,248,946 B1 | 6/2001 | Dwek | |
| 6,259,774 B1 | 7/2001 | Miloslavsky | |
| 6,266,651 B1 | 7/2001 | Wooston | |
| 6,269,336 B1 | 7/2001 | Ladd et al. | |
| 6,269,361 B1 | 7/2001 | Davis et al. | |
| 6,282,515 B1 | 8/2001 | Speicher | |
| 6,292,799 B1 | 9/2001 | Peek et al. | |
| 6,298,056 B1 | 10/2001 | Pendse | |
| 6,301,342 B1 | 10/2001 | Ander et al. | |
| 6,301,350 B1 | 10/2001 | Henningson et al. | |
| 6,304,637 B1 | 10/2001 | Mirashrafi et al. | |
| 6,310,941 B1 | 10/2001 | Crutcher et al. | |
| 6,311,231 B1 | 10/2001 | Bateman et al. | |
| 6,314,402 B1 | 11/2001 | Monaco et al. | |
| 6,314,454 B1 | 11/2001 | Wang et al. | |
| 6,323,894 B1 | 11/2001 | Katz | |
| 6,353,663 B1 | 3/2002 | Stevens et al. | |
| 6,381,325 B1 | 4/2002 | Hanson | |
| 6,385,583 B1 | 5/2002 | Ladd et al. | |
| 6,389,278 B1 | 5/2002 | Singh | |
| 6,389,541 B1 | 5/2002 | Patterson | |
| 6,393,117 B1 | 5/2002 | Trell | |
| 6,393,412 B1 | 5/2002 | Deep | |
| 6,400,806 B1 | 6/2002 | Uppaluru | |
| 6,404,864 B1 | 6/2002 | Evslin et al. | |
| 6,404,877 B1 | 6/2002 | Bolduc et al. | |
| 6,404,884 B1 | 6/2002 | Marwell et al. | |
| 6,408,278 B1 | 6/2002 | Carney et al. | |
| 6,430,276 B1 | 8/2002 | Bouvier et al. | |
| 6,434,527 B1 | 8/2002 | Horvitz | |
| 6,461,162 B1 | 10/2002 | Reitman et al. | |
| 6,463,136 B1 | 10/2002 | Malik | |
| 6,470,079 B1 | 10/2002 | Benson | |
| 6,470,317 B1 | 10/2002 | Ladd et al. | |
| 6,470,338 B1 | 10/2002 | Rizzo et al. | |
| 6,477,246 B1 | 11/2002 | Dolan et al. | |
| 6,484,148 B1 | 11/2002 | Boyd | |
| 6,493,437 B1 | 12/2002 | Olshansky | |
| 6,493,671 B1 | 12/2002 | Ladd et al. | |
| 6,493,673 B1 | 12/2002 | Ladd et al. | |
| 6,504,920 B1 | 1/2003 | Okon et al. | |
| 6,510,417 B1 | 1/2003 | Quilici et al. | |
| 6,513,013 B1 | 1/2003 | Stephanou | |
| 6,519,570 B1 | 2/2003 | Faber et al. | |
| 6,523,010 B2 | 2/2003 | Lauffer | |
| 6,523,101 B1 | 2/2003 | Nakata | |
| 6,529,878 B2 | 3/2003 | De Rafael et al. |
| 6,535,506 B1 | 3/2003 | Narain et al. |
| 6,539,359 B1 | 3/2003 | Ladd et al. |
| 6,542,732 B1 | 4/2003 | Khazaka et al. |
| 6,546,372 B2 | 4/2003 | Lauffer |
| 6,549,889 B2 | 4/2003 | Lauffer |
| 6,560,576 B1 | 5/2003 | Cohen et al. |
| 6,563,915 B1 | 5/2003 | Salimando |
| 6,606,376 B1 | 8/2003 | Trell |
| 6,609,106 B1 | 8/2003 | Robertson |
| 6,611,501 B1 | 8/2003 | Owen et al. |
| 6,625,595 B1 | 9/2003 | Anderson et al. |
| 6,636,590 B1 | 10/2003 | Jacob et al. |
| 6,658,389 B1 | 12/2003 | Alpdemir |
| 6,668,286 B2 | 12/2003 | Noble et al. |
| 6,691,093 B2 | 2/2004 | Shell |
| 6,704,403 B2 | 3/2004 | Lurie et al. |
| 6,731,625 B1 | 5/2004 | Eastep et al. |
| 6,732,183 B1 | 5/2004 | Graham |
| 6,741,691 B1 | 5/2004 | Ritter et al. |
| 6,757,364 B2 | 6/2004 | Newkirk |
| 6,771,760 B1 | 8/2004 | Vortman et al. |
| 6,775,359 B1 | 8/2004 | Ron et al. |
| 6,798,753 B1 | 9/2004 | Doganata et al. |
| 6,801,899 B2 | 10/2004 | Lauffer |
| 6,807,532 B1 | 10/2004 | Kolls |
| 6,807,571 B2 | 10/2004 | Hatano et al. |
| 6,836,225 B2 | 12/2004 | Lee et al. |
| 6,839,737 B1 | 1/2005 | Friskel |
| 6,865,540 B1 | 3/2005 | Faber et al. |
| 6,898,435 B2 | 5/2005 | Milman |
| 6,910,159 B2 | 6/2005 | Phillips et al. |
| 6,968,174 B1 | 11/2005 | Trandal et al. |
| 6,990,183 B2 | 1/2006 | Holland et al. |
| 7,013,280 B2 | 3/2006 | Davis et al. |
| 7,031,697 B2 | 4/2006 | Yang et al. |
| 7,032,030 B1 | 4/2006 | Condignotto |
| 7,046,782 B2 | 5/2006 | Miller |
| 7,212,615 B2 | 5/2007 | Wolmuth |
| 7,224,781 B2 | 5/2007 | Jacob et al. |
| 7,363,254 B2 | 4/2008 | Skinner |
| 2001/0012357 A1 | 8/2001 | Mirashrafi et al. |
| 2001/0025274 A1 | 9/2001 | Zehr et al. |
| 2001/0026609 A1 | 10/2001 | Weinstein et al. |
| 2001/0027481 A1 | 10/2001 | Whyel |
| 2001/0029482 A1 | 10/2001 | Tealdi et al. |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0044751 A1 | 11/2001 | Pugliese, III et al. |
| 2001/0048737 A1 | 12/2001 | Goldberg et al. |
| 2002/0003867 A1 | 1/2002 | Rothschild et al. |
| 2002/0010608 A1 | 1/2002 | Faber et al. |
| 2002/0010616 A1 | 1/2002 | Itzhaki |
| 2002/0024948 A1 | 2/2002 | Pendse |
| 2002/0029241 A1 | 3/2002 | Yokono et al. |
| 2002/0038233 A1 | 3/2002 | Shubov et al. |
| 2002/0038293 A1 | 3/2002 | Seiden |
| 2002/0042826 A1 | 4/2002 | Gaus et al. |
| 2002/0059082 A1 | 5/2002 | Moczygemba |
| 2002/0065959 A1 | 5/2002 | Kim et al. |
| 2002/0069105 A1 | 6/2002 | do Rosario Botelho et al. |
| 2002/0071423 A1 | 6/2002 | Mirashrafi et al. |
| 2002/0071426 A1 | 6/2002 | Karamchedu et al. |
| 2002/0072974 A1 | 6/2002 | Pugliese et al. |
| 2002/0073207 A1 | 6/2002 | Widger et al. |
| 2002/0077891 A1 | 6/2002 | Castle et al. |
| 2002/0087565 A1 | 7/2002 | Hoekman et al. |
| 2002/0091607 A1 | 7/2002 | Sloan et al. |
| 2002/0094074 A1 | 7/2002 | Lurie |
| 2002/0095331 A1 | 7/2002 | Osman et al. |
| 2002/0095359 A1 | 7/2002 | Mangetsu |
| 2002/0107697 A1 | 8/2002 | Jensen |

| | | |
|---|---|---|
| 2002/0112005 A1 | 8/2002 | Namias |
| 2002/0116266 A1 | 8/2002 | Marshall |
| 2002/0120554 A1 | 8/2002 | Vega |
| 2002/0128891 A1 | 9/2002 | McSherry |
| 2002/0133402 A1 | 9/2002 | Faber et al. |
| 2002/0133570 A1 | 9/2002 | Michel |
| 2002/0133571 A1 | 9/2002 | Jacob et al. |
| 2002/0169836 A1 | 11/2002 | Hood et al. |
| 2002/0191762 A1 | 12/2002 | Benson |
| 2002/0193094 A1 | 12/2002 | Lawless et al. |
| 2002/0193135 A1 | 12/2002 | Nakano |
| 2003/0005126 A1 | 1/2003 | Schwartz et al. |
| 2003/0041255 A1 | 2/2003 | Chen et al. |
| 2003/0043981 A1 | 3/2003 | Lurie et al. |
| 2003/0046161 A1 | 3/2003 | Kamanger et al. |
| 2003/0061094 A1 | 3/2003 | Banerjee et al. |
| 2003/0112944 A1 | 6/2003 | Brown et al. |
| 2003/0115089 A1 | 6/2003 | Lurie |
| 2003/0126205 A1 | 7/2003 | Lurie |
| 2003/0135460 A1 | 7/2003 | Talegon |
| 2003/0140084 A1 | 7/2003 | D'Angelo |
| 2003/0220837 A1 | 11/2003 | Asayama |
| 2003/0220866 A1 | 11/2003 | Pisaris-Henderson |
| 2003/0223565 A1 | 12/2003 | Montemer |
| 2003/0225682 A1 | 12/2003 | Montemer |
| 2004/0006511 A1 | 1/2004 | Montemer |
| 2004/0010518 A1 | 1/2004 | Montemer |
| 2004/0023644 A1 | 2/2004 | Montemer |
| 2004/0038673 A1 | 2/2004 | Dunn et al. |
| 2004/0044571 A1 | 3/2004 | Bronnimann et al. |
| 2004/0066927 A1 | 4/2004 | Horvath et al. |
| 2004/0083133 A1 | 4/2004 | Nicholas et al. |
| 2004/0096110 A1 | 5/2004 | Yogeshwar et al. |
| 2004/0100497 A1 | 5/2004 | Quillen et al. |
| 2004/0162757 A1 | 8/2004 | Pisaris-Henderson |
| 2004/0193740 A1 | 9/2004 | Kasmirsky et al. |
| 2004/0196833 A1 | 10/2004 | Dahan et al. |
| 2004/0199494 A1 | 10/2004 | Bhatt |
| 2004/0204997 A1 | 10/2004 | Blaser et al. |
| 2004/0225562 A1 | 11/2004 | Turner |
| 2004/0234049 A1 | 11/2004 | Melideo |
| 2004/0234064 A1 | 11/2004 | Melideo |
| 2004/0236441 A1 | 11/2004 | Melideo |
| 2004/0252820 A1 | 12/2004 | Faber et al. |
| 2004/0254859 A1 | 12/2004 | Aslanian, Jr. |
| 2004/0258048 A1 | 12/2004 | Melideo |
| 2004/0260413 A1 | 12/2004 | Melideo |
| 2005/0010795 A1 | 1/2005 | Tagawa et al. |
| 2005/0021744 A1 | 1/2005 | Haitsuka et al. |
| 2005/0033641 A1 | 2/2005 | Jha et al. |
| 2005/0044238 A1 | 2/2005 | Jacob et al. |
| 2005/0048961 A1 | 3/2005 | Ribaudo et al. |
| 2005/0065811 A1 | 3/2005 | Chu et al. |
| 2005/0071509 A1 | 3/2005 | Faber et al. |
| 2005/0080878 A1 | 4/2005 | Cunningham et al. |
| 2005/0086104 A1 | 4/2005 | McFadden |
| 2005/0114210 A1 | 5/2005 | Faber et al. |
| 2005/0165666 A1 | 7/2005 | Wong et al. |
| 2005/0203796 A1 | 9/2005 | Anand et al. |
| 2005/0203799 A1 | 9/2005 | Faber et al. |
| 2005/0209874 A1 | 9/2005 | Rossini |
| 2005/0216341 A1 | 9/2005 | Agarwal et al. |
| 2005/0216345 A1 | 9/2005 | Altberg |
| 2005/0220289 A1 | 10/2005 | Reding et al. |
| 2005/0222908 A1 | 10/2005 | Altberg et al. |
| 2005/0251445 A1 | 11/2005 | Wong et al. |
| 2006/0031516 A1 | 2/2006 | Kumer |
| 2006/0075104 A1 | 4/2006 | Kumer |
| 2006/0095343 A1 | 5/2006 | Clarke et al. |
| 2006/0149624 A1 | 7/2006 | Baluja et al. |
| 2006/0184378 A1 | 8/2006 | Agarwal et al. |
| 2006/0200380 A1 | 9/2006 | Ho et al. |
| 2006/0215826 A1 | 9/2006 | Lurie et al. |
| 2007/0078717 A1 | 4/2007 | Ho et al. |
| 2007/0100799 A1 | 5/2007 | Rose et al. |
| 2007/0174124 A1 | 7/2007 | Zagofsky et al. |

FOREIGN PATENT DOCUMENTS

| | | |
|---|---|---|
| EP | 04253389.3 | 9/2004 |
| GB | 2329046 A | 10/1999 |
| JP | 409233441 A | 9/1997 |
| JP | 409319812 A | 12/1997 |
| JP | 2002007887 | 1/2002 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | 0057326 | 9/2000 |
| WO | WO 00/73960 | 12/2000 |
| WO | WO 00/73960 A1 | 12/2000 |
| WO | WO 01/01217 | 1/2001 |
| WO | WO 01/01217 A2 | 1/2001 |
| WO | 0120518 | 3/2001 |
| WO | 0127825 | 4/2001 |
| WO | WO 01/28141 | 4/2001 |
| WO | WO 01/28141 A1 | 4/2001 |
| WO | WO 01/44973 | 6/2001 |
| WO | WO 01/44973 A2 | 6/2001 |
| WO | 0184415 | 11/2001 |
| WO | 0213110 | 2/2002 |
| WO | 0237470 | 5/2002 |
| WO | WO 02/44870 | 6/2002 |
| WO | PCT/US01/51181 | 3/2003 |
| WO | 2005109287 | 11/2005 |
| WO | 2006091966 | 8/2006 |

OTHER PUBLICATIONS

U.S. Appl. No. 60/198,642, filed Apr. 20, 2000, Rothschild et al.
U.S. Appl. No. 60/471,535, filed May 19, 2003, Melideo.
Abhaya Asthana and Paul Krzyzanowski, "A Small Domain Communications System for Personalized Shopping Assitance," Proceedings of ICPWC'94, Publication No. 0-7803-1996-6/94,IEEE, 1994, pp. 199-203.
Amir Herzberg, et al., "MiniPay: Charging Per Click on the Web," Computer Networks and ISDN Systems 29, (Sep. 1997) vol. 29, pp. 939-951.
Answers.com Web Page (www.answers.com).
"Applying Technology News," Accounting Technology, p. 14 (Feb./Mar. 1997).
Aspect Telecomm: Aspect Integrates the Web into the Call Center, M2 Presswire, Aug. 1996.
Barbara Jarvie, "Company Devoted To Hot-Line Support", Computer Reseller News, Oct. 21, 1991, p. 48.
Big Green Blog: Jan. 2005 Archives, Feb. 21, 2006.
Caring for Customers: Real-Time text chat and telephony provide personalized customer support and turn queries into sales leads, Internet World Media, Sep. 1999.
Chris Ott, "Making Good on the Informationo Economy". Denver Business Journal, Dec. 17, 1999, p. 27.
Christina Wood, "Hidden Cost of Tech Support", PC World, May 1995, pp. 143-152 & p. 156.
Collett, Stacey & Julie King, "Why Online Browsers Don't Become Buyers," Computerworld. vol. 33, No. 48, p. 14 (Nov. 1999).
"Connecting to On-Line Car Shoppers: Auto Sellers Use Netcall Internet Call-Button Technology to Turn Clicks into Interactive Sales", Business Wire, p. 4089., Jul. 1999.
Cynthia Hodgson, "Online Expert Databases & Services", Econtent, Dec. 1999, p. 48-53.
Davey, Tom, "Wheeling and Dealing Online", PC Week, vol. 13, No. 45, pp. 1, 129., Nov. 1996.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.

Edith Herman, "US Courts To Launch First Federal 900 Service," Federal Computer Week, Sep. 28, 1992, p. 8.

Ellen Greenblatt, "Have you ever wondered . . . ", Datamation, Oct. 1997, p. 12.

EXP.com Web Site at www.exp.com/.

"Expertcity.com Launches Premier Online Marketplace for Expert Services," PR Newswire (Aug. 1999).

For Telesphere's Clients, Dial '1-900-TUF Luck', Business Week, Sep. 9, 1991, 88.

Franco Mercalli, et al., "TheESSAI Teleshopping System: An Example of Broadband Multimedia Application," Publication No. 0-7803-1820-X/94, IEEE, pp. 572-576 (1994).

Gregory Dalton, "Rent-An-Expert On the Web," Information Week p. 75 (Sep. 6, 1999).

Healey, Jon, "From A to Z, You Can Sell Advice Online." Retrieved from http://www.mercurycenter.com on Oct. 24, 2000, published on Nov. 7, 1999.

Infomarkets.com Web Site (www.infomarkets.com).

Information about Expertcity.com retrieved from the internet [http://www.expertcity.com] on Nov. 6, 2000.

Information about Expertcity.com retrieved from the Internet [URL:http://www.expertcity.com] on Apr. 9, 2000.

Information, Bid and Asked, Forbes, Aug. 20, 1990, 92.

Ingenio Press Archives for 2004, www.ingenio.com, Feb. 21, 2006.

Intellect Exchange Web Site (www.intellectexchange.com).

"Introducing 1-800-FREE411: First Nationwide Free Telephone Directory Assistance Service" Jingle Networks, Inc., Huntington Beach, Calif., Sep. 20, 2005.

ISDN Tutorial: Definitions, http://www.ralphb.net/ISDN/defs.html (Apr. 21, 2000).

ISDN Tutorial:Interfaces, http://www.ralphb.net/ISDN/ifaces.html, printed on Apr. 21, 2000.

J. Sairamesh, et al., "NetBazaar: Networked Electronic Markets For Trading Computation And Information Services", Research and Advanced Technology for Digital Libraries. Second European Conference, ECDL 1998. pp. 839-856 (Sep. 21-23, 1998).

J.W.R. Griffiths, et al., "Multimedia Communication In A Medical Environment", IEEE 1991 Singapore I.C. on Networks, p. 166 (8 pgs.).

"Jambo Launches to Connect People and businesses From the Internet to the Phone", Agoura Hills, Calif. May 3, 2005.

"Jambo Names Netzero Co-founder Stacy Haitsuka to New Post of Chief Information Officer", Agoura Hills, Calif., Jul. 5, 2005.

"Jambo Receives $5 Million in Financiing from Kline Hawkes & Co., Westlake Venture Partners, Others", Agoura Hills, Calif., Oct. 17, 2005.

Jeff Peline, "Net Firm to Connect Users by Phone," CNET News.com [retrieved from http://new.cnet.com] (Oct. 24, 2001) published Nov. 8, 1999.

Joann M. Wasik, "Information for Sale: Commercial Digital Reference and AskA Service", Virtual Reference Desk, Sep. 20, 1999, at www. vrd.org/AskA/commAskA.html.

John Robinson, "Attachmate Ready to Answer Net Questions", Network World, Apr. 8, 1996, p. 37.

Joseph Menn, "An Expert? There's Now a Home for You on the Internet", Los Angeles Times (retrieved from http://denverpost.com on Oct. 24, 2001).

Keen.com, Inc. v. InfoRocket.com, Inc., Complaint for Patent Infringement, Trade Dress Infringement and Unfair Competition; Demand for Jury Trial filed Aug. 31, 2001, pp. 1-8 plus 17 pgs. of attachments.

Keen.com, Inc. v. InfoRocket.com, Inc., Preliminary Injunction Hearing, pp. 286-289 (Jan. 8, 2002).

Keen.com Feb. 4, 2006.

Keen.com Plans Web Service Allowing Customers to Hold Private Phone Chats, Don Clark, Wall Street Journal, Nov. 8, 1999.

"Keen.com™ Launches First Live Answer Community™, Connects People with Information to Share Over Their Standard Telephone", Press Release [retrieved from http://keen.com] (Oct. 24, 2000), published Nov. 8, 1999.

Keen.com raises $60 Million from Prestigious . . . , Business Wire, Jan. 11, 2000.

Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.

L. F. Ludwig and D. F. Dunn, "Laboratory for Emulation and Study of Integrated and Coordinated Media Communication," Conference on Office Communication Systems, Mar. 23-25, 1988, Sponsored by ACM SIGOIS and IEEECS TC-OA in cooperation with IFIP W.G. 8.4, pp. 283-291.

Linda Littleton, "Meet the Shadowy Future," Proceedings of ACM SIGUCCS User Services Conference XXII Ypsilanti, Michigan Oct. 16-19, 1994, pp. 205-210.

"Lucent Technology and Netscape Team to Deliver Lucent Ecommerce Solutions," Business Wire, Sep. 1998.

Masahiko Hase, Shuji Kawakubo and Mineo Shoman, "Advanced Videophone System Using Synchronized Video Filing Equipment," NTT Review, vol. 3, No. 4 Jul. 1991, pp. 29-36.

Michael Kanellos, "Do You Want to Know The Meaning of Life?", Computer Reseller News, Mar. 3, 1997, pp. 72-74.

Michael Rogers et al, "Experts Abound at New Web Sites", Library Journal, Mar. 1, 2000, pp. 22-24.

"Netcall Internet Call Buttons Enhance E-Commerce Customer Service and Sales", PR Newswire, p. 7431, Aug. 1999.

PCT Search Report for PCT Application No. PCT/US01/48284, filed Oct. 30, 2001 (corresponding to U.S. Appl. No. 09/702,217) mailed May 13, 2002 (7 pgs.).

Qcircuit Web Site (www.qcircuit.com).

Richard A Kuehn, "The Voice of Technology," Credit World, pp. 20-23 (Jul. 1994).

Sell and buy advice online, The Ottawa Citizen, Nov. 29, 1999.

"Surfbrains.com: Brains online save time & money", M2 Presswire, Jul. 11, 2000.

Tehrani, Rich, "e-Rip Van Winkle and the 60 Second Nap," Call Center Solution, vol. 18, No. 2, pp. 16(3)., Aug. 1999.

Telecommunications Buyers Guide and Directory, Editor & Publisher, pp. 29TC-38TC, Feb. 1994.

The Web Site at www.experts-exchange.com/.

The web-site at www.allexperts.com.

"TriNet's, Help Me, I'm Stuck, Internet Voice Button Services Pushes Web Pages to Online Users." Business Wire, Mar. 1998.

"UpSnap Selects LookSmart to Sell Premium Listings on Free 411 Service for Text-Enabled Cell Phones", Nov. 4, 2004.

"USA Global Link Brings Interactively to Internet Shopping," Business Wire, Oct. 1998.

"Walker Digital Issued Landmark U.S. Patent No. 5,862,223 for Global Internet Marketplace for Experts", Business Wire, Jan. 26, 1999.

Welcome to the Electronic Emissary Project's WebCenter at www. tapr.org/emmisary/.

"Welcome to Jambo—leader in Pay-per-Call Solutions" (search results) Oct. 17, 2005.

When Business Plan and Real World Clash, Wall Street Journal, Jun. 9, 1999, B1.

William H. Chimiak, et al, "Multimedia Collaborative Remote Consultation Tools Via Gigabit WAN in Teleradiology", IEEE 1994, Phoenix, p. 417 (7 pgs.).

"Applying Technology News," Accounting Technology, p. 14, Feb./Mar. 1997.

"Connecting to On-Line Car Shoppers: Auto Sellers Use Netcall Internet Call-Button Technology to Turn 'Clicks' into Interactive Sales," Business Wire, p. 4089, Jul. 19, 1999.

Addeo, E.J. et al., "An Experimental Multi-Media Bridging System," Frontiers in Computer Communications Technology, Computer Communications Review, vol. 17, No. 5, pp. 236-242, Aug. 11-13, 1987.

Answers.com, company information retrieved from http://www.answers.com, available at least by Aug. 8, 2000.

Asthana, Abhaya et al., "A Small Domain Communications System for Personalized Shopping Assistance," IEEE International Conference on Personal Wireless Communications, Publication No. 0-7803-1996-6/94, pp. 199-203, Aug. 18, 1994.

Drescher, Bob et al., "Aspect Telecommunications Integrates the Web into the Call Center to Deliver New Level of Customer Service," Business Wire, Aug. 5, 1996.

Ellis, James E., "For Telesphere's Clients, Dial 1-900 TUF LUCK," Business Week, pp. 88-89, Sep. 9, 1991.

EXP.com, Inc., company information retrieved from http://www.exp.com, available at least by Sep. 20, 2000.

Green Digital Media, Inc., Bug Green Blog: Jan. 2005 Archives, Jan. 28-31, 2005.

Greenblatt, Ellen, "Have You Ever Wondered . . . .," Datamation, p. 126, Oct. 1997.

Herman, Edith, "U.S. Courts to Launch First Federal 900 Service," Federal Computer Week, pp. 8, 10, Sep. 28, 1992.

Information Markets Corp., company information retrieved from http://www.infomarkets.com, available at least by Aug. 8, 2000.

Mercalli, Franco et al.,"The ESSAI Teleshopping System: An Example of a Broadband Multimedia Application," IEEE Global Telecommunications Conference, pp. 572-576, Nov. 28, 1994.

Ott, Chris, "Making Good on the Information Economy," Denver Business Journal, vol. 51, No. 17, p. 27A, Dec. 17, 1999.

QCircuit.com, company information retrieved from http://www.qcircuit.com, available at least by Aug. 8, 2000.

Wagner, Mary, "Caring for Customers: Real-Time Text Chat and Telephony Provide Personalized Customer Support and Turn Queries into Sales Leads," Internet World Media, vol. 5, iss. 28, p. 30, Sep. 1, 1999.

Wieland, Heidi et al., "Expertcity.com Launches Premier Online Marketplace for Expert Services," PR Newswire, Aug. 30, 1999.

ADS-Click, "ADS-click Adds Skype-Based Pay-Per-Call Advertising Capabilities to Its Private-Labeled Solution, which will be Unveiled at ad:tech New York," Market Wire, Oct. 10, 2005.

Jingle Networks, Inc., "1-800-FREE411 Provides Two Great Opportunities to Acquire New Customers," available at least by Oct. 20, 2005.

ISA/US, International Search Report for International Application No. PCT/US05/12061, 3 pages, Nov. 17, 2006.

Keen.com, "The Most Popular U.S. Question and Answer Marketplace Goes International 90 Days After Launch," PR Newswire, Mar. 13, 2000.

Alexander, Kelly King et al., "1-900 (Pay-For-Information Phone Services), " Baton Rouge Business Report, vol. 9, No. 20, pp. 23-27, Jul. 30, 1991.

Kempner, Matt, "SWM Seeking—the Net Rather than Newspapers," Atlanta Journal the Atlanta Constitution, p. Q1, Sep. 10, 2000.

Turco, Franco, "Legislation is Planned to Hem in 'Scooplines' Covers Revealing Rates, Blocking Service," Arizona Republic, Final Edition, Valley & State Section, p. B8, Jan. 16, 1988.

Sterling, Greg, "Ingenio's Ether—Pay Per Professional Advice," Search Engine Journal, Mar. 3, 2006.

USPTO, Transaction History for U.S. Appl. No. 11/072,147, filed Mar. 3, 2005, entitled "Methods and Apparatuses for Sorting Lists for Presentation."

USPTO, Transaction History for U.S. Appl. No. 11/559,860, filed Nov. 14, 2006, entitled "Methods and Apparatuses for Prioritizing Advertisements for Presentation."

USPTO, Transaction History for U.S. Appl. No. 11/688,245, filed Mar. 19, 2007, entitled "Methods and Apparatuses for Prioritizing Featured Listings."

USPTO Transaction History of U.S. Appl. No. 11/072,147, filed Mar. 3, 2005, entitled "Methods and Apparatuses for Sorting Lists for Presentation."

USPTO Transaction History of U.S. Appl. No. 11/559,860, filed Nov. 14, 2006, entitled "Methods and Apparatuses for Prioritizing Advertisements for Presentation."

USPTO Transaction History of U.S. Appl. No. 11/688,245, filed Mar. 19, 2007, entitled "Methods and Apparatuses for Prioritizing Featured Listings."

International Application No. PCT/US07/82439, Written Opinion and International Search Report, Feb. 21, 2008.

International Application No. PCT/US06/07023, Written Opinion and International Search Report, Aug. 7, 2007.

\* cited by examiner

Featured Listings: Place a Bid

Select a Maximum Bid Amount per Qualified Click

Listing Title: Astrology listing title
Category/Topic: Psychics & Astrology
              Astrology/Horoscopes   View Bids
              Chinese Astrologers   View Bids

Psychics & Astrology

Next 5 >

| Position | Name | Title | Topic | Max Bid |
|---|---|---|---|---|
| 1 | VICTORIA SANDS | PROBLEM WITH A SOULMATE? I CAN HELP! EXT 84259 | Love & Relationships | $7.25 |
| 2 | GR8-NRG | 5* Star Clairvoyant - WILL GIVE TIME FRAMES | Life Questions | $7.20 |
| 3 | Lady Aquarius | Let me help you with all of your problems | Love & Relationships | $7.00 |
| 4 | Pauls Tarot | Simply put, I believe I can help you. Please call. | Tarot Readers | $7.00 |
| 5 | Pauls Tarot | Simply put, I believe I can help you. Please call. | Love & Relationships | $7.00 |

Next 5 >

FIG. 10a

METHOD AND APPARATUS FOR PRIORITIZING A LISTING OF INFORMATION PROVIDERS

BACKGROUND OF THE INVENTION

1. Field of the Invention

The invention relates to the field of accessing information online. More specifically, the invention relates to providing access to information providers online.

2. Background of the Invention

Information providers, such as therapists, computer technicians, tax advisors, etc., have increasingly been delivering their services through the Internet and telephone. Information providers can advertise their services online for viewing by Internet users. In addition, users can search for information providers with conventional search engines.

Once the user finds a desired information provider and selects the information provider, the user can contact that person for services delivered immediately through the Internet or telephone. For example, a customer selects a therapist from a list of therapists displayed online. The selected therapist is offering an instant consultation fee of $1 per minute or $50 for a full one-hour session. The therapist's advertisement displays an indicator of real-time availability—such as a green light—that indicates that this therapist is ready to perform the consultation at the present time. The customer can contact the therapist by clicking an on-screen button that initiates a telephone call or video chat session. The customer can then receive the consultation and pay the therapist automatically online.

In such an online system, the information provider signals to the customer when the information provider is ready to deliver services. Otherwise, a customer may initiate contact while the therapist is not available. The information provider manages the online indicator of his/her availability, informing the system when he/she is ready to communicate with customers. For example, when the therapist is out to lunch, he/she uses the online system to change the availability indicator from green to red, informing everyone that this information provider is no longer available at the present time.

Search engines typically provide advertisers with the ability to place advertisements according to specific keywords. A seller of antique vases, for instance, will pay the search engine to display his/her advertisement when a customer searches on the keyword "vases." In order to sell keyword advertising most efficiently, search engines will typically use a bidding system, in which advertisers bid in order to have their advertisements appear more prominently, or higher in an ordered list, than competing advertisers. Other bidding systems take into account the popularity of certain advertisers among customers, and factor in this popularity as well as bid amounts into the ranking of advertisers.

These bidding systems, however, fail when it comes to displaying information providers rather than advertisements for objects or web sites. This is because information providers are human and are not always available to provide services—they may be busy with another customer or out to lunch. If a search engine were to use a typical bidding system in order to display information providers, the top bidders, and therefore the top service advertisements, are likely to be unavailable information providers. This would be a dead-end result for the customer.

Therefore, a need exists for a combination of a bidding mechanism and an additional criteria to determine the order that information provider advertisements are to be displayed.

BRIEF SUMMARY OF THE INVENTION

A method and apparatus for prioritizing a listing of information providers is described. According to one aspect of the invention, the listing of information providers is prioritized according to a fee value and availability status indicated for each information provider. The method additionally provides for retrieving a set of one or more information provider identifiers that satisfy a request for a type of information provider that has been received from a user over the Internet. The set of information provider identifiers are ranked according to their associated fee values and availability status. A set of one or more files are generated to display the set of information provider identifiers. The set of files are transmitted to the user, and the user is provided access to an information provider identified by one of the set of information provider identifiers.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings:

FIGS. 10a-c illustrate example web interfaces for an information provider to review the fees paid by the competing information providers to an information provider search engine service for a priority listing according to one embodiment of the invention.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Overview

Methods and apparatuses provide for prioritizing information providers accessible via the Internet. In response to receiving a search term(s) for an information provider, an information provider search engine provides access to an information provider relevant to the search term(s) via the Internet. The information provider search engine prioritizes the information providers and displays the information providers relevant to the search term(s) according to the prioritization.

The information providers are prioritized according to multiple prioritizing variables. A first of the prioritizing variables indicates a fee that an information provider pays to the information provider search engine. A second of the prioritizing variables indicates availability of an information provider. Additional prioritizing variables can be combined with the fee variable and the availability variable for prioritizing the information providers.

Prioritizing Information Provider Listings

Figure 1:
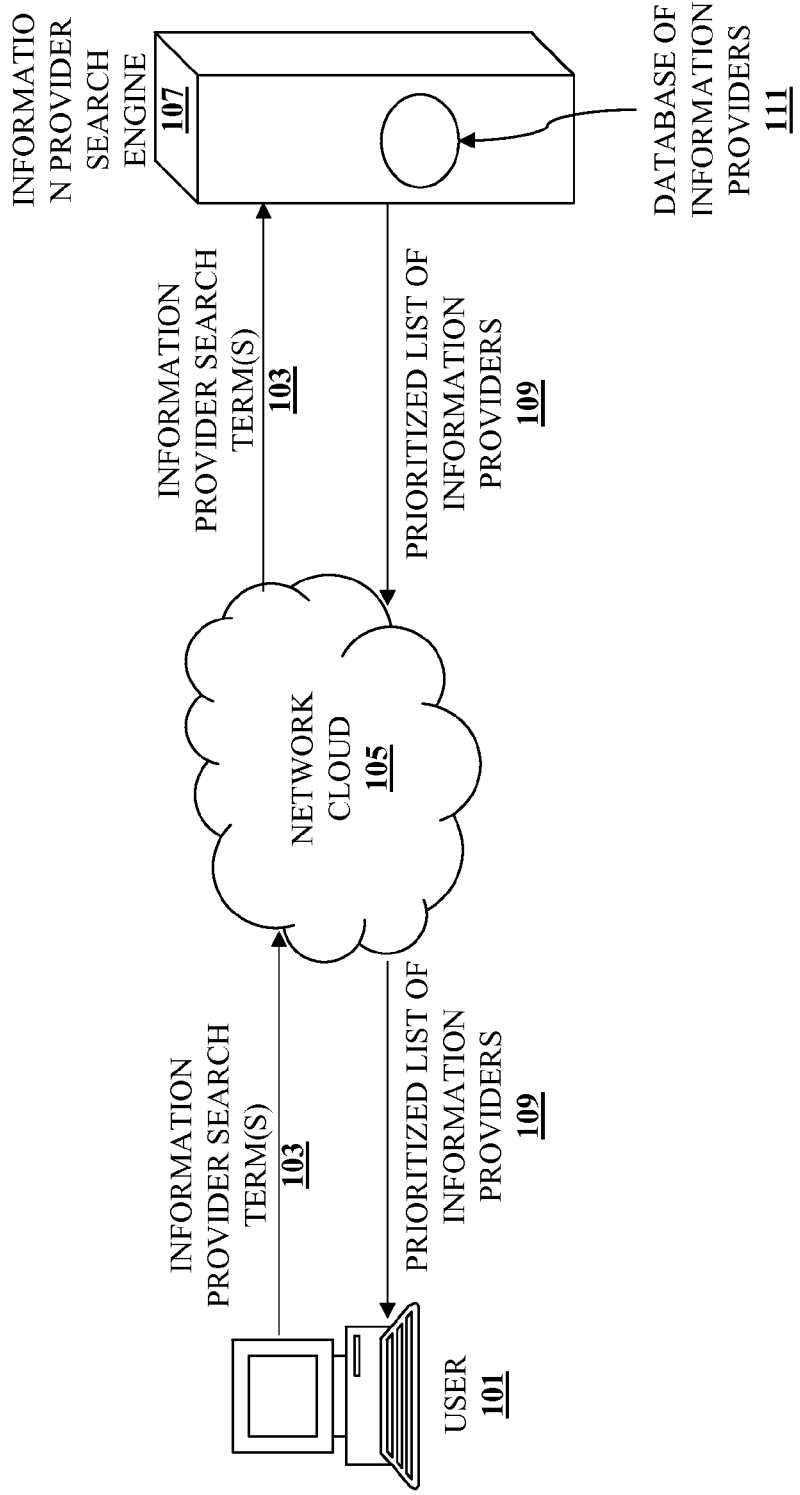
FIG. 1 is an exemplary diagram of a network including an information provider search engine according to one embodiment of the invention.

FIG. 1 is an exemplary diagram of a network including an information provider search engine according to one embodiment of the invention. In FIG. 1, a user 101 transmits an information provider search term(s) 103 through a network cloud 105 to an information provider search engine 107. Various techniques can be utilized for communicating an information provider search term(s) to the information provider search engine. For example, the information provider search term(s) is entered by a user. In another example, the information provider search term(s) is a link selected by the user.

The information provider search engine 107 includes a database of information providers 111. The information provider search engine 107 retrieves information provider information from the database of information providers 111 relevant to the received information provider search term(s) 103. The information provider search engine 107 prioritizes the retrieved information providers into a list as will be described in more detail later. Although the retrieved information providers are described as being prioritized into a list, the term 'list' is only used to aid in understanding the described invention and is not meant to be limiting upon the described invention. The retrieved information provider information may be organized into tables, trees, etc. The prioritized list of information providers 109 is sent from the information provider search engine 107 to the user 101.

The servers described above include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Figure 2:
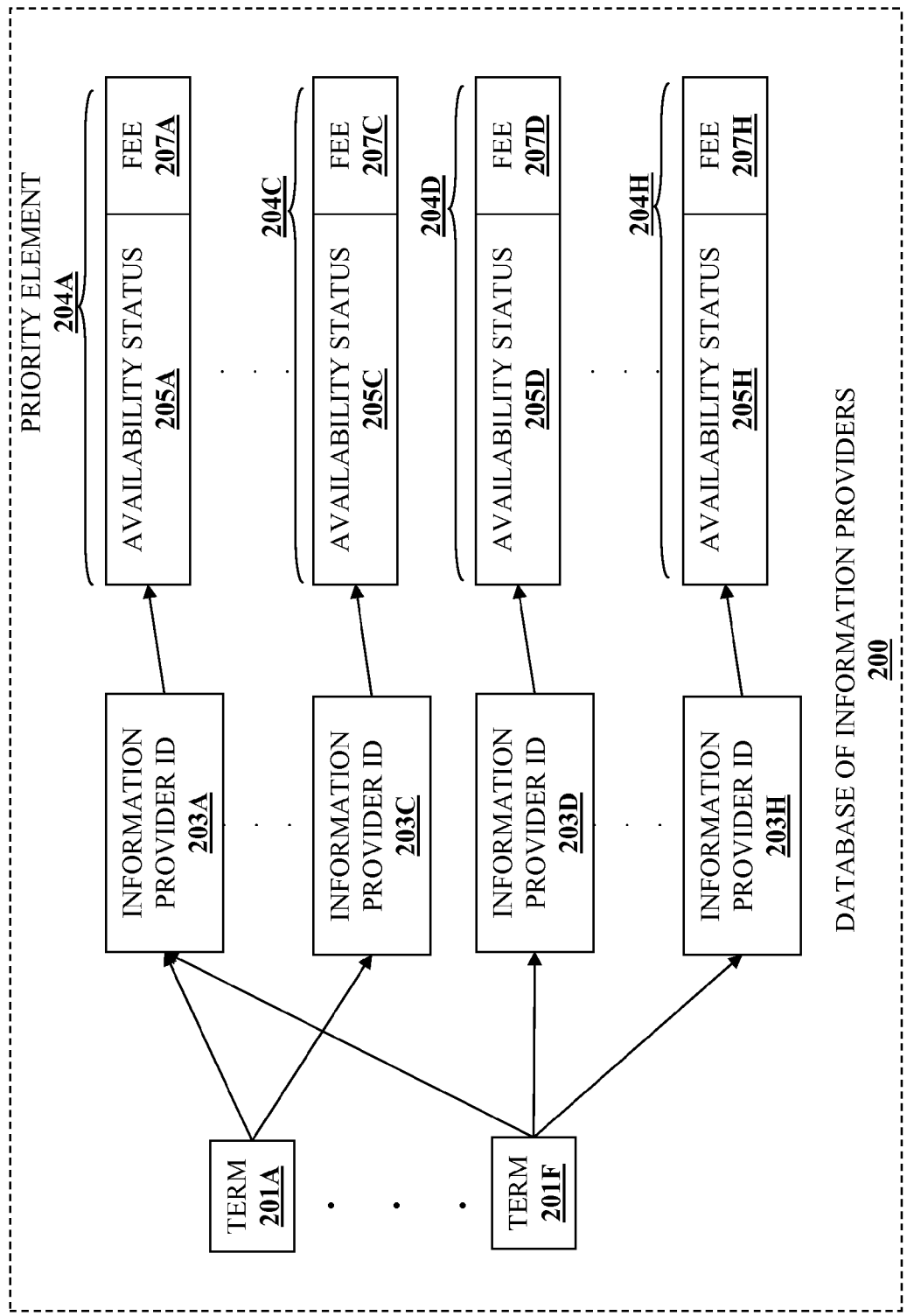
FIG. 2 is a conceptual diagram of an exemplary database of information providers according to one embodiment of the invention.

FIG. 2 is a conceptual diagram of an exemplary database of information providers according to one embodiment of the invention. A database of information providers 200 includes term elements 201A-201F. The term element 201A is linked to information provider identifier elements 203A-203C. In an alternative embodiment of the invention, categories index an information provider database in addition to or instead of terms. The term element 201A is linked to consecutive information provider identifier elements in this illustration, but it is not necessary to the described invention. The term element 201A could be linked to information provider identifier elements 203A and 203C, but not the information provider identifier element 203B in a different illustration. The term 201F is linked to the information provider identifier element 203A and information provider identifier elements 203D-203H. An information provider identifier can be a variety of values including an alphanumeric identifier, a memory address, etc. While in one embodiment of the invention the information provider identifier is a uniform resource locator, in alternative embodiments of the invention the information provider database includes uniform resource locators associated with each of the information provider identifiers.

The information provider identifier elements 203A, 203C, 203D, and 203H are respectively linked to priority elements 204A, 204C, 204D, and 204H. The priority elements 204A, 204C, 204D, and 204H respectively include availability status fields 205A, 205C, 205D, and 205H. The priority elements 204A, 204C, 204D, and 204H also respectively include fee fields 207A, 207C, 207D, and 207H.

The availability status field indicates availability of a corresponding information provider (e.g., available, busy, arrange for later call, not taking calls, etc.). The fee field indicates a fee to be paid by the identified information provider to the information provider search engine. The fee may be a flat fee, an action based fee, a percentage of the information provider's fee, a fee grade, etc. In one embodiment of the invention, a fee grade level is a value indicating a level of fee. The fee varies based on a number of factors (e.g., the type of information provider, the user's action, etc.). An action based fee is a fee that varies in relation to whether the user is connected to the information provider, the information provider is selected but not connected, the information provider is viewed but not selected, etc.

In one embodiment of the invention, the information provider is charged a click fee only if the end user has a credit card in the system. Hence, the system may be more efficient if the information provider can bid for a more tangible event, such as the click of a real customer as opposed to the click of a fickle browser. In another embodiment of the invention, the information provider is not charged when a customer without a credit card in the system clicks on the information provider's listing, but is later charged when the customer add his/her credit card into the system, for example, adding their credit card in the system within a predetermined number days.

In one embodiment, the information provider is not charged a click fee if the customer had previously called them within a predetermined number of days. This ensures that an information provider can bid a high click price and will not be bogged down by their existing customers selecting them. In one embodiment, there is a limit to the number of paid clicks that one end user can impart in a single day, or over a predetermined period of time. As a result, there is a control that prevents a single end user from clicking repeatedly on hundreds of consultants, thus sabotaging the system and deflating the ROI of consultants. Furthermore, an embodiment may include a limit on the number of paid clicks that one end user can impart upon a single information provider in a single day, or predetermined period of time. This feature prevents an end user from sabotaging a single information provider in particular.

Although FIG. 2 illustrates the information provider database as a tree structure, various embodiments of the invention implement the information provider database differently (e.g., a hash table, multi-dimensional array, a hash table referencing a tree, etc.).

When an information provider search engine, such as the information provider search engine 107 of FIG. 1, receives a search term, the information provider search engine searches the database of information providers for the received search term. Upon locating the received search term in the database of information providers, the information provider search engine retrieves those information provider identifiers and priority elements associated with the located search term. The priority elements are used to prioritize the retrieved information provider identifiers. Various embodiments of the invention prioritize the retrieved information providers differently. In one embodiment of the invention, the retrieved information providers are first prioritized, or ranked, according to the value indicated in the fee field and then according to the availability status. In another embodiment of the invention, the retrieved information providers are first prioritized by the value indicated in the availability status field and then the value indicated in the fee field. Alternative embodiments of the invention include additional fields in the priority element. For example, in addition to availability and fee, retrieved information providers are ranked according to a rating (user rating, auditor rating, combination of auditor rating and user rating, etc.), relevancy to the search term(s), name, years of experience, number of referrals, number of user responses, etc.

In addition, in an alternative embodiment, an information provider is further required to have a certain level of feedback to be retrieved and displayed. For example, an information provider may be required to have received feedback from a predetermined number of previous customers and/or have an average review that equal or exceeds a predetermined rating (e.g., at least a 4 out of 5 star rating).

In yet another alternative embodiment, an information provider is required to have a web page (or comparable resource link) of a predetermined level of quality to be retrieved and displayed. For example, information providers may be required to have a web page or resource link that includes a photo or a summary of their qualifications.

Figure 3:
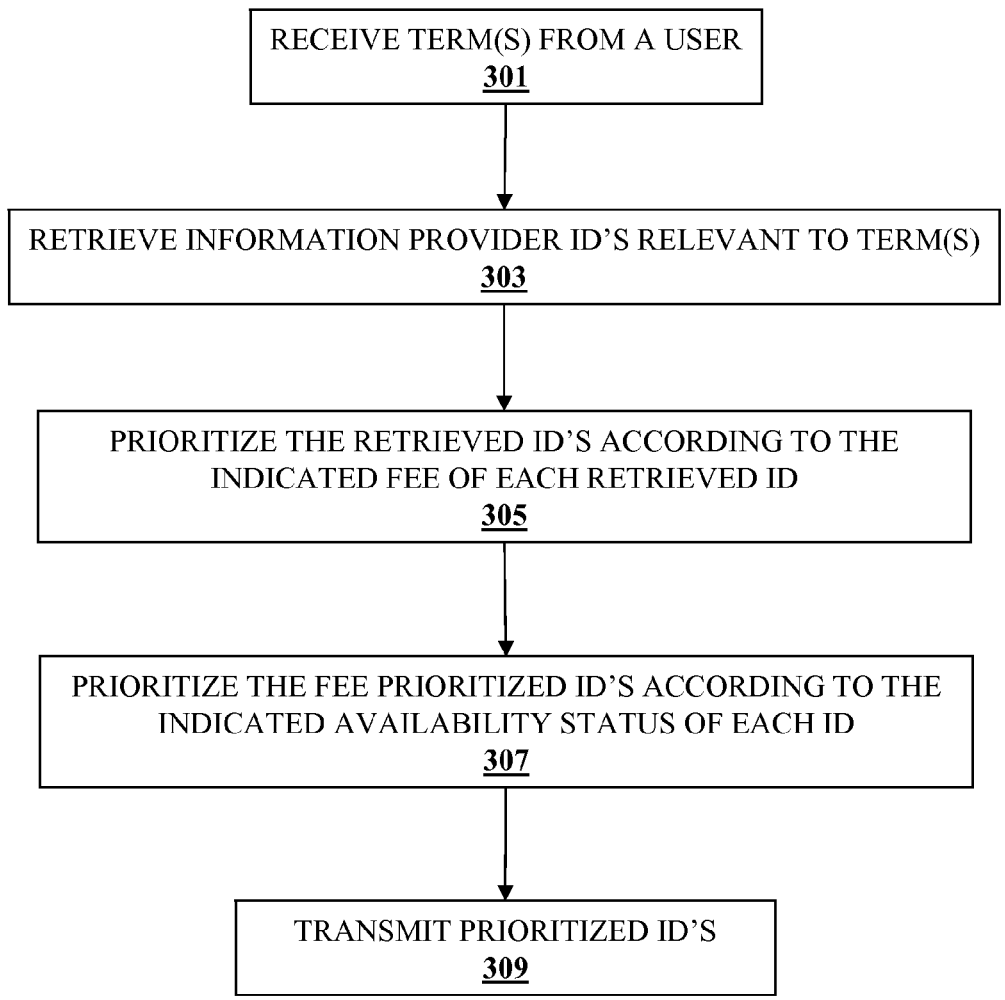
FIG. 3 is a flowchart for providing a prioritized list of information providers according to one embodiment of the invention.

FIG. 3 is a flowchart for providing a prioritized list of information providers according to one embodiment of the invention. At block 301, a search term(s) is received from a user. At block 303, information provider identifiers relevant to the received search term(s) are retrieved. At block 305, the retrieved information provider identifiers are prioritized according to the indicated fee value of each retrieved information provider identifier. At block 307, the fee prioritized information provider identifiers are prioritized according to the indicated availability status of each information provider identifier. At block 309, the prioritized information provider identifiers are transmitted to the user.

Figure 4:
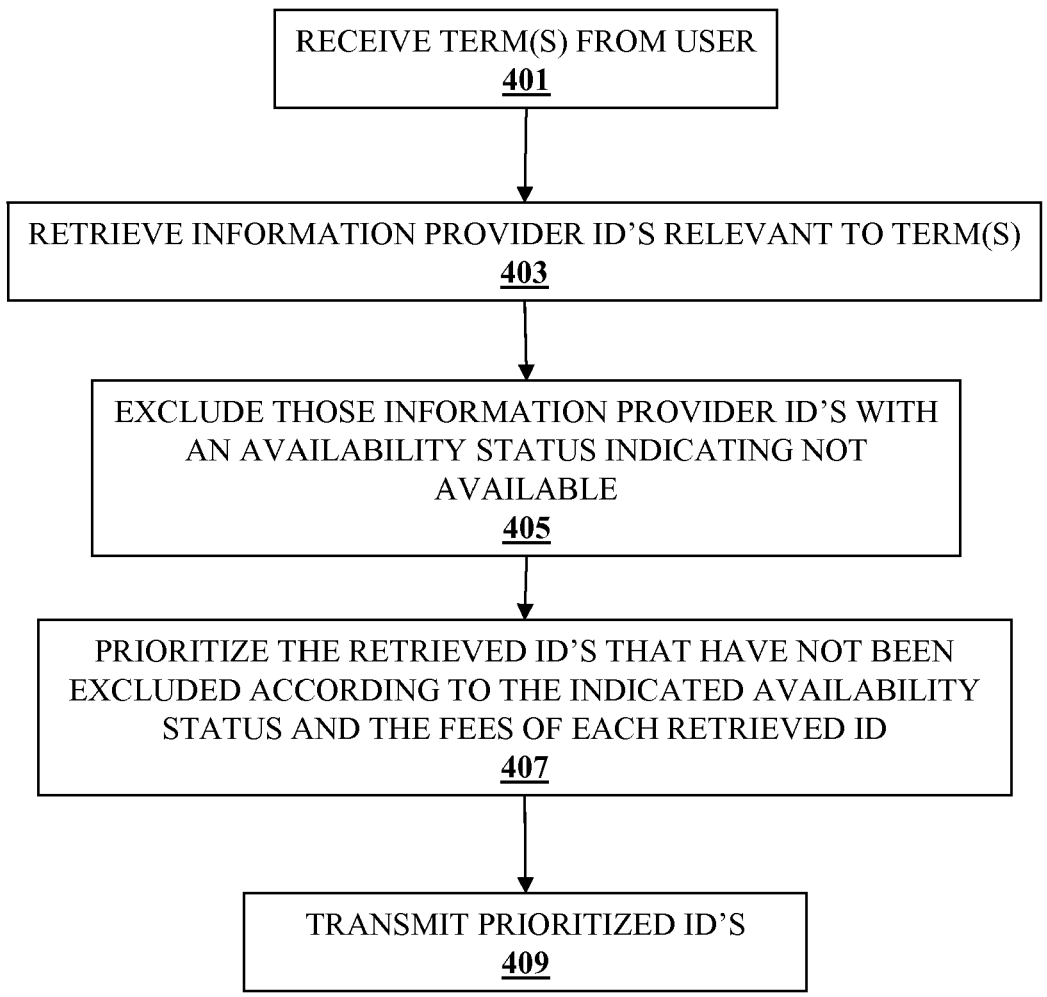
FIG. 4 is a flowchart for providing a prioritized list of available information providers according to one embodiment of the invention.

FIG. 4 is a flowchart for providing a prioritized list of available information providers according to one embodiment of the invention. At block 401, a search term(s) is received from a user. At block 403, information provider identifier relevant to the received search term(s) are retrieved. At block 405, those retrieved information provider identifiers with an availability status of not available are excluded. At block 407, the retrieved information provider identifiers that have not been excluded are prioritized according to the indicated availability status and the indicated fee of each of the remaining retrieved information provider identifiers. At block 409, the prioritized information provider identifiers are transmitted to the user. In an alternative embodiment of the invention, the prioritized information provider identifiers are transmitted to an intermediary device or module that prepares the prioritized information provider identifiers for display to the user.

Figure 5:
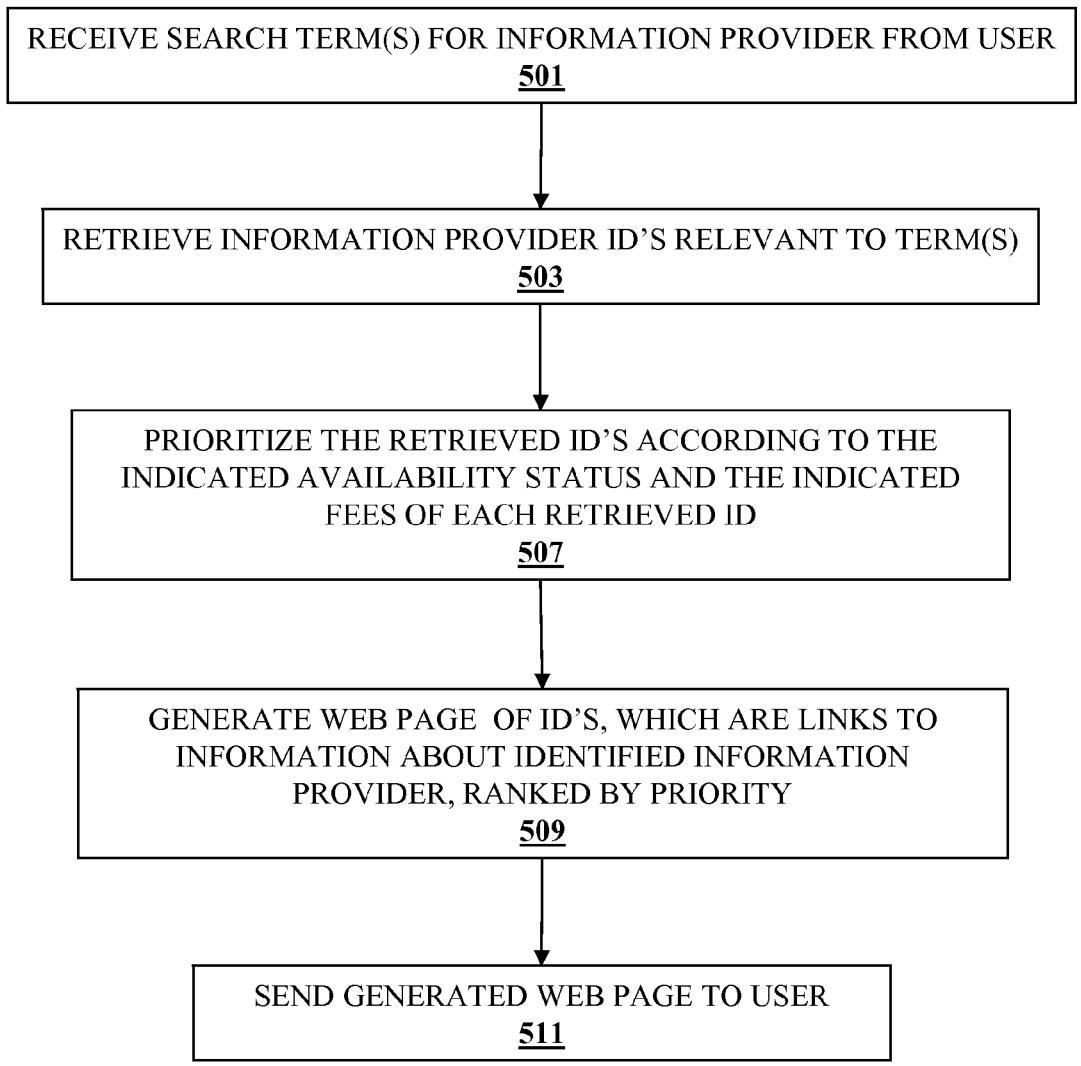
FIG. 5 is a flowchart for generating a web page with prioritized information providers according to one embodiment of the invention.

FIG. 5 is a flowchart for generating a web page with prioritized information providers according to one embodiment of the invention. At block 501, a search term(s) for an information provider is received from a user. At block 503, the information provider identifiers that are relevant to the received search term(s) are retrieved. At block 507, the retrieved information provider identifiers are prioritized according to the indicated availability status and the indicated fee for each of the retrieved information provider identifiers. At block 509, a web page of information provider identifiers, which are links to information about the identified information providers, ranked by priority is generated. At block 511, the generated web page is sent to the user.

Figure 6:
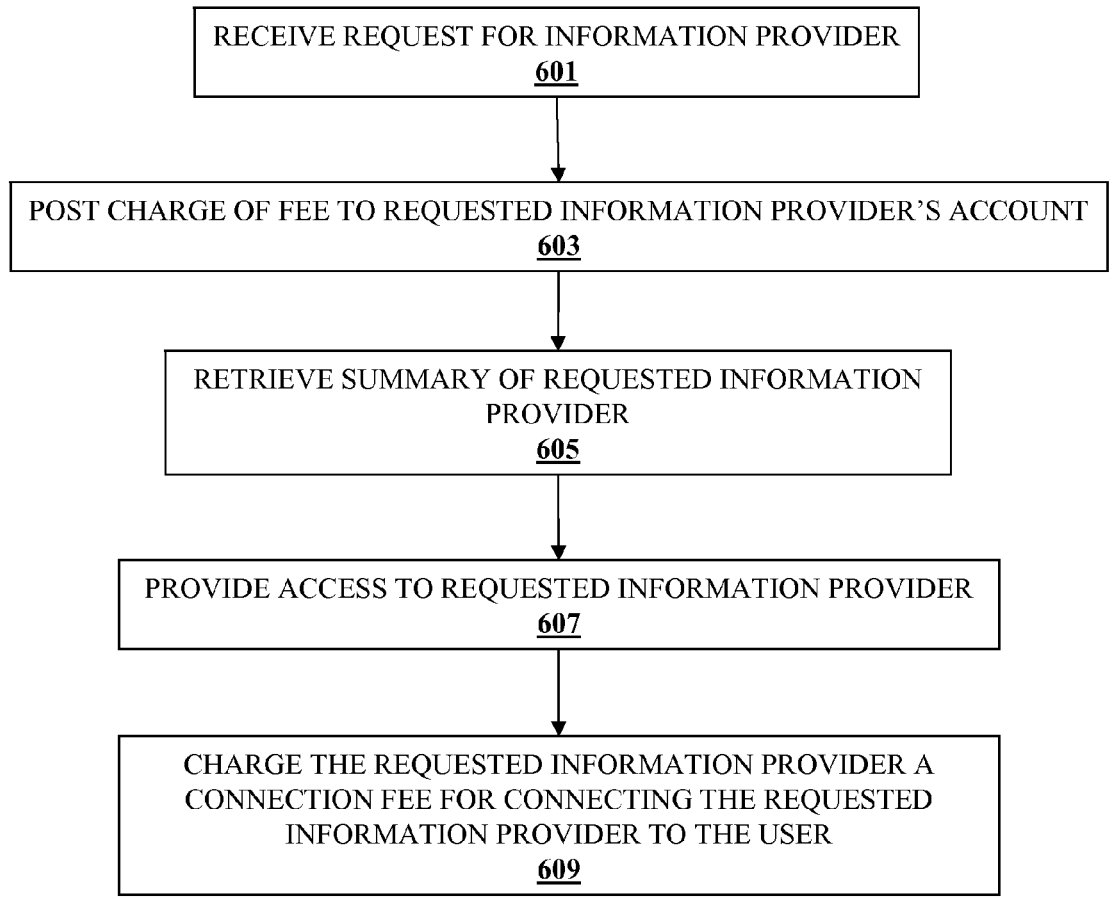
FIG. 6 is a flowchart for charging an information provider a fee according to one embodiment of the invention.

FIG. 6 is a flowchart for charging an information provider a fee according to one embodiment of the invention. At block 601, a request for an information provider is received. At block 603, a charge fee is posted to the requested information provider's account. For FIG. 6, it is assumed that each information provider has an account with the information provider search engine. Information providers are assessed a fee by the information provider search engine, which is posted to the information provider's account. The information provider search engine may collect the fee charged by the information provider from the user and credit the information provider's account, or a third party may be responsible for collections. In an alternative embodiment of the invention, the information provider search engine does not manage accounts for information providers, but has access to at least one of their financial accounts (credit card, checking account, etc.). At block 605, a summary describing the requested information provider is requested. At block 607, access to the requested information provider is provided to the user. At block 609, the requested information provider is charged a connection fee for being connected to the user by the information provider search engine.

Figure 7:
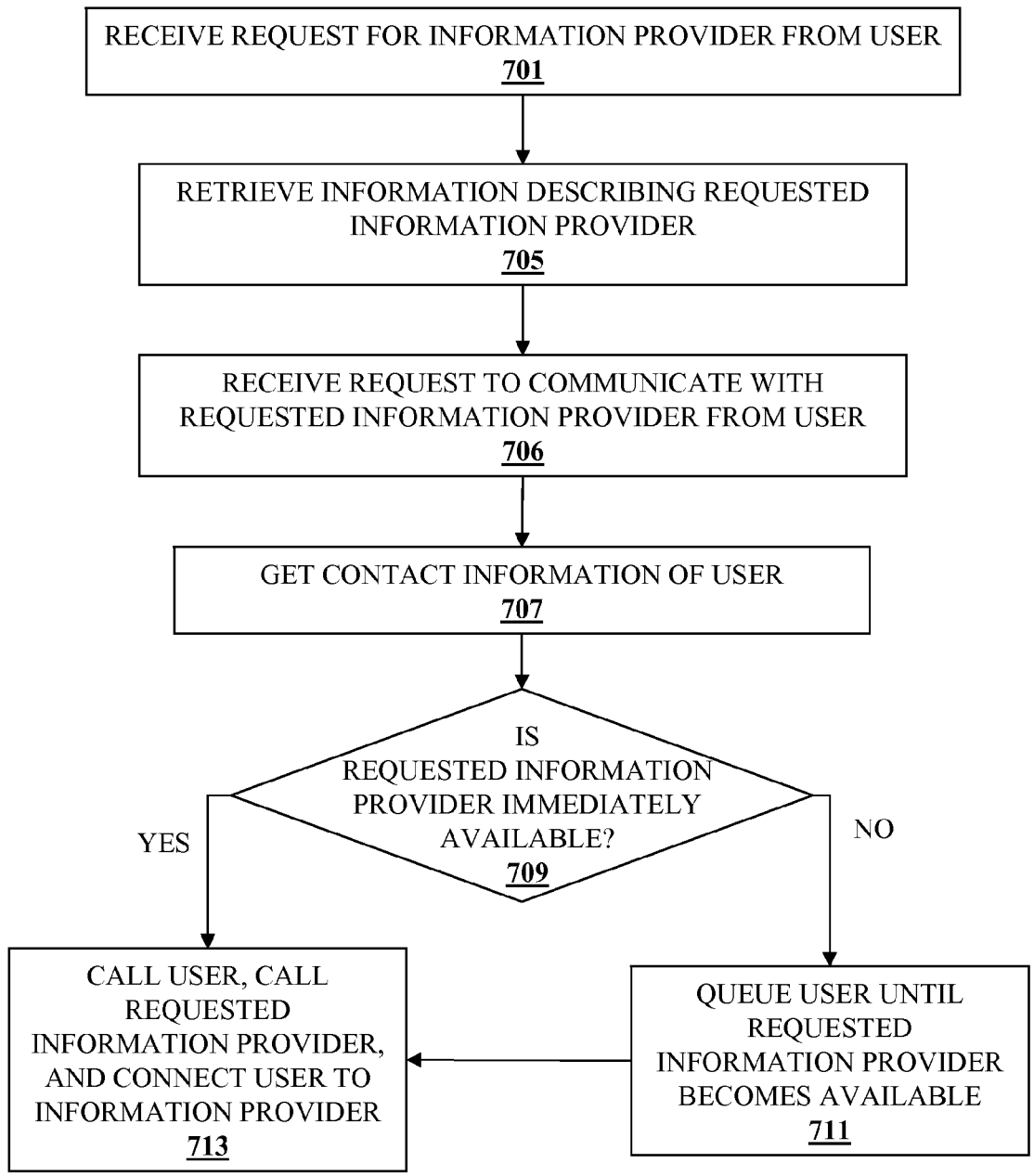
FIG. 7 is a flowchart for connecting a user to a requested information provider according to one embodiment of the invention.

FIG. 7 is a flowchart for connecting a user to a requested information provider according to one embodiment of the invention. At block 701, a request for an information provider is received from a user. At block 705, information describing the requested information provider is retrieved. At block 706, a request to communicate with the requested information provider is received from the user. At block 707, contact information is retrieved from the user. At block 709, it is determined if the requested information provider is immediately available. If the requested information provider is immediately available, then control flows to block 713. If the requested information provider is not immediately available, then control flows to block 711.

At block 713, the user is called, the requested information provider is called, and the user and requested information provider are entered into real-time communication, which may include a telephone connection, a voice connection over the internet, a live video connection, or an alternative form of communication.

At block 711, the user is queued until the requested information provider becomes available. From block 711, control flows to block 713.

Figure 8:
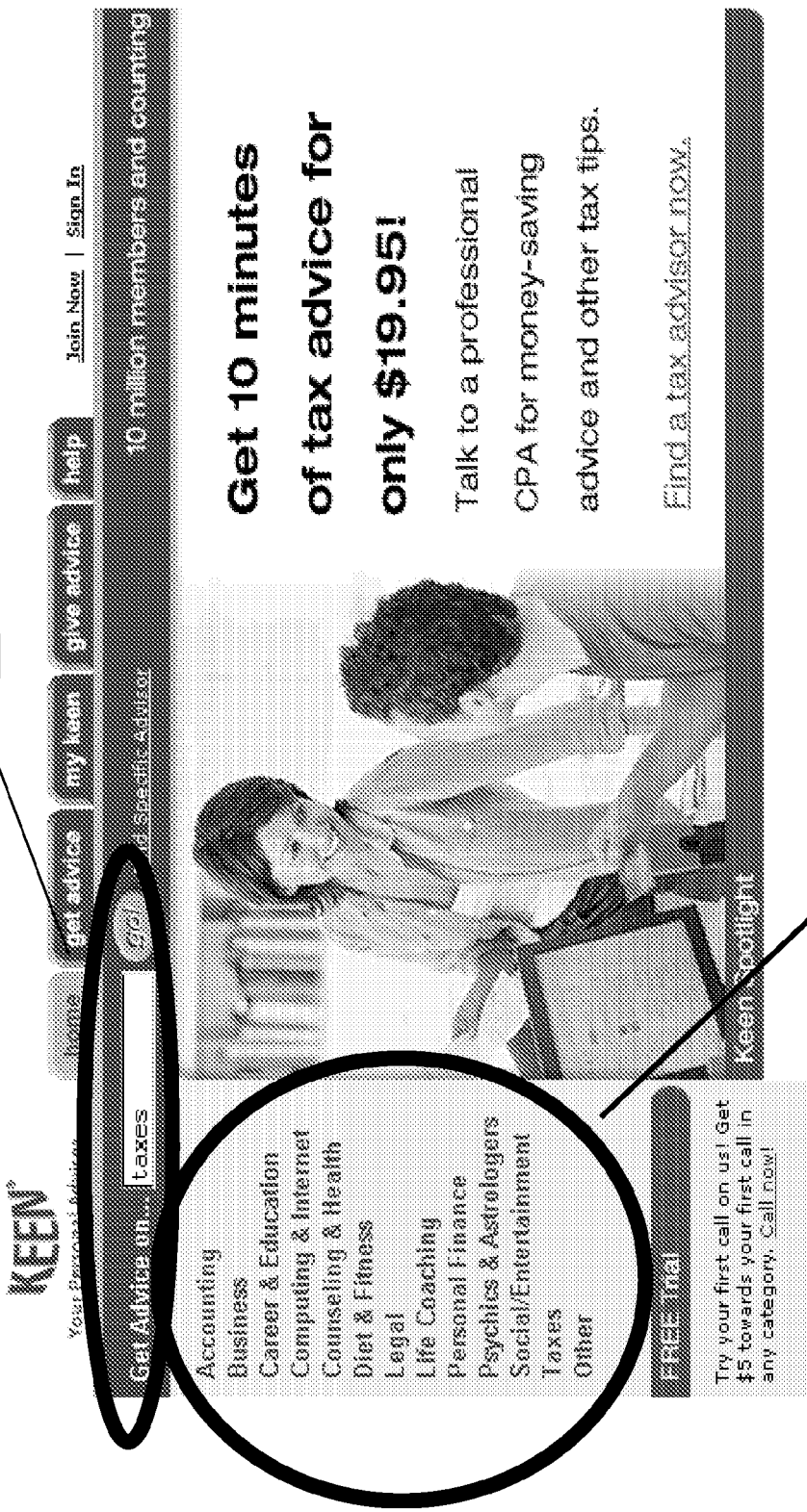
FIG. 8 is a screenshot of a web page for an information provider search engine according to one embodiment of the invention.

FIG. 8 is a screenshot of a web page or web site for an information provider search engine according to one embodiment of the invention. A screenshot of a web page illustrated in FIG. 8 includes a search term(s) information provider search tool 801. A user enters one or more search terms in a field and then clicks on the "go!" link. In addition to the search term(s) information provider search tool 801, the example web page includes a category information provider search tool 803. A user selects a category keyword which is either a link to additional keywords within the category, or brings the user to a web page that displays a prioritized list of information provider identifiers relevant to the selected category.

Figure 9:
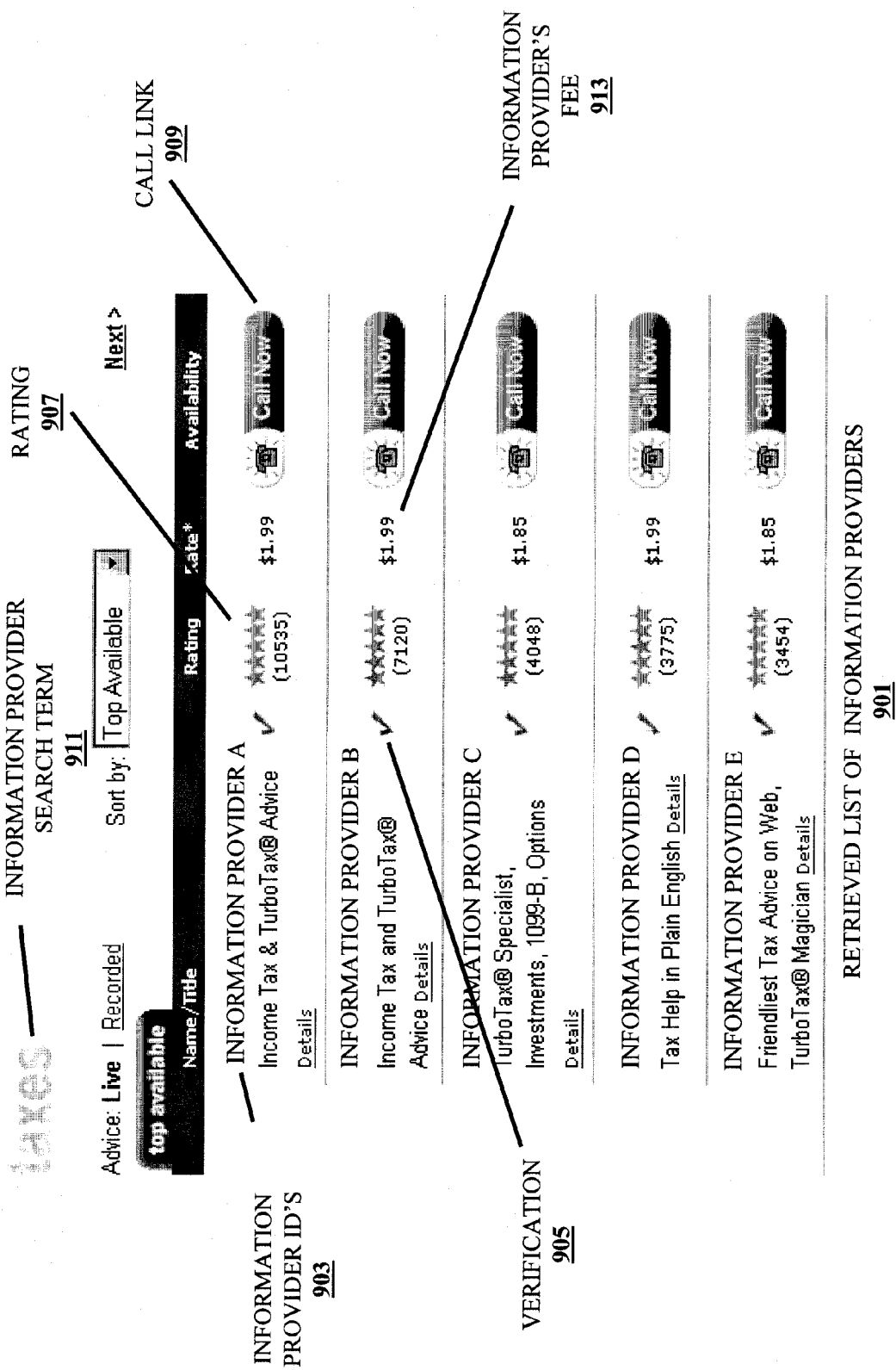
FIG. 9 is a screen shot of an exemplary web page displaying a prioritized list of information provider identifiers according to one embodiment of the invention.

FIG. 9 is a screen shot of an exemplary web page displaying a prioritized list of information provider identifiers according to one embodiment of the invention. In FIG. 9, an information provider search term 911 is displayed at the top of the web page. In this example, the information provider search term 911 is "taxes." An information provider identifier 903 identifies a particular information provider. The information provider identifier 903 in the example illustrated in FIG. 9 is a link to a web page of information describing the identified information provider. A verification graphic 905 indicates whether a particular information provider has been verified by the information provider search engine and/or a third party verification entity. A rating 907 indicates a rating level for a particular information provider. In the example illustrated in FIG. 9, the rating 907 is a graphic of stars, although in alternative embodiments of the invention the rating may be a numerical value. An information provider's fee 913 indicates the per minute fee charged by the information provider to the user. A call link 909 is a link to a web page to collect information from a user in order to connect the user to a particular information provider.

FIG. 10*a* is an example web interface for an information provider to review the fees paid by the competing information providers to an information provider search engine for priority listing according to one embodiment of the invention. FIG. 10*a* illustrates a web page that lists 5 information providers in the area of Psychics and Astrology. The web page shows the position, name, listing title, topic, and maximum bid, or fee, to be paid to the information provider search engine to obtain a higher position in the prioritized listing. The information provider in the first position has agreed to pay the information provider a priority fee of $7.25. The information provider in the second position has agreed to pay the information provider a priority fee of $7.20. The remaining three information providers have agreed to pay the information provider a priority fee of $7.00. The remaining three information providers are prioritized based on other priority variables since they have all agreed to pay the same priority fee.

Figure 10B:
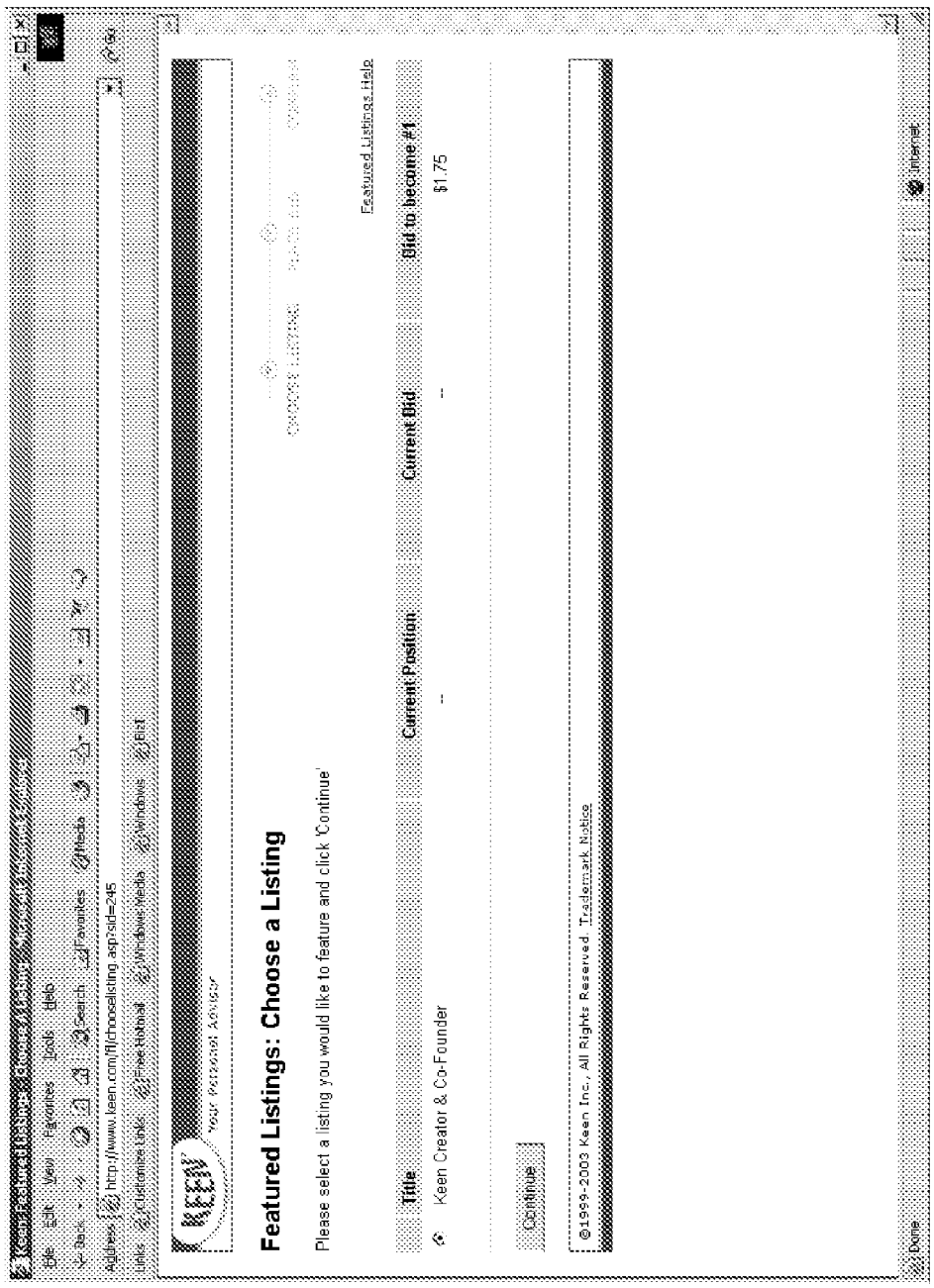
Figure 10C:
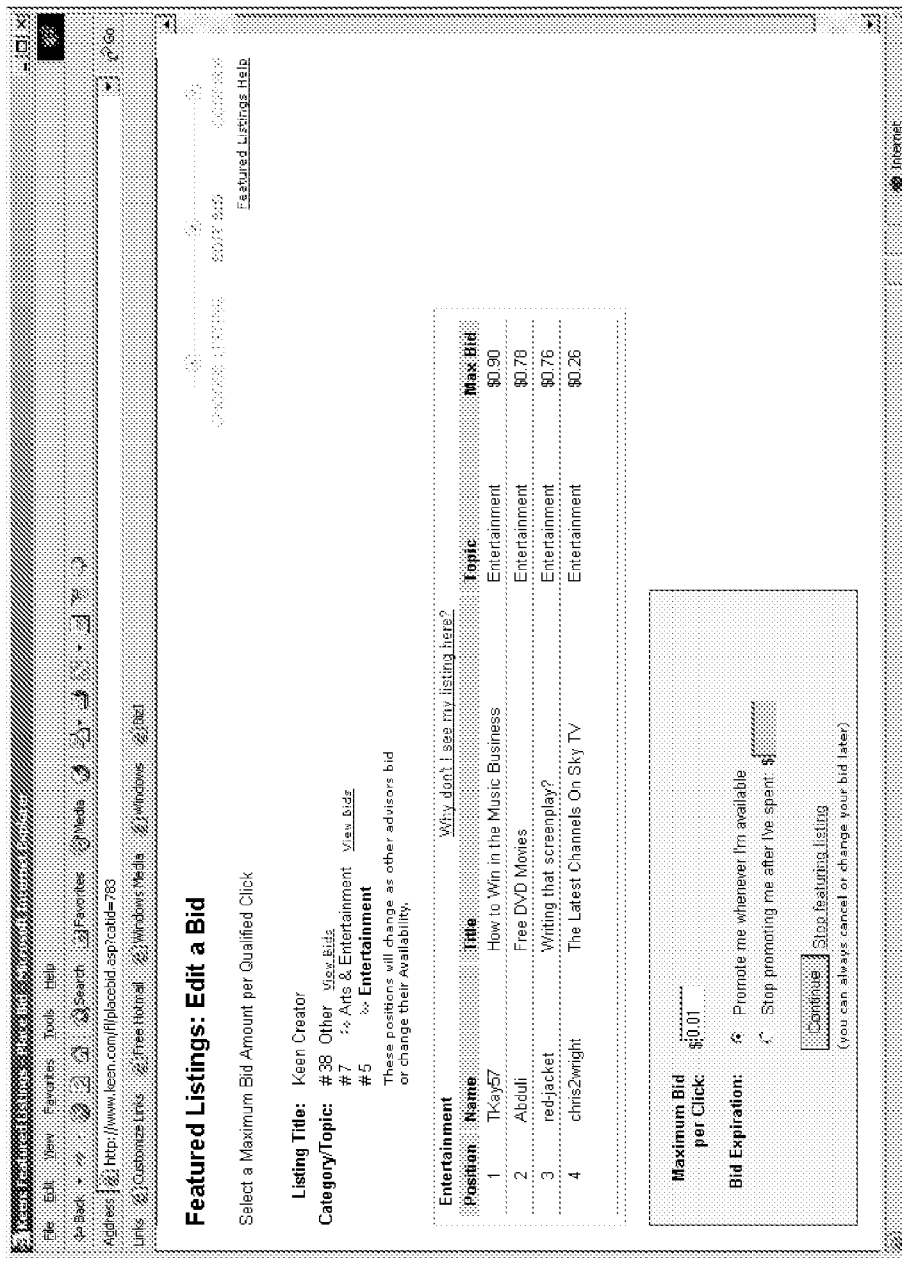

FIG. 10*b* is an example web interface for an information provider to select a listing or category for which they would like to bid to increase their respective priority position. In the example shown in FIG. 10*b*, the information provider has selected the listing "Keen Creator," and submitted a bid of $1.75 to become the #1 prioritized position. Furthermore, FIG. 10*c* is an example web interface requesting the information provider confirm their respective bid.

Figure 11:
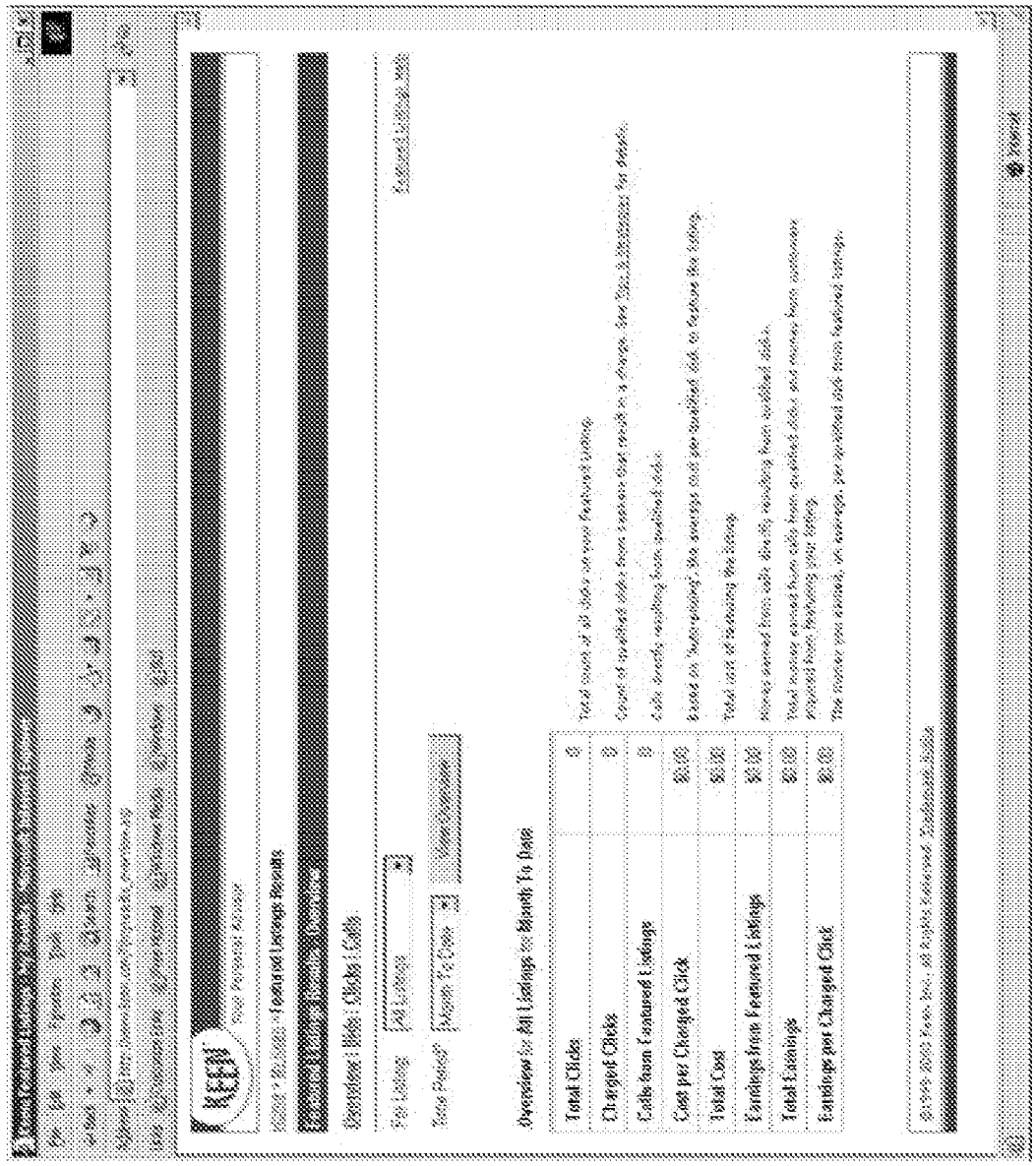
FIG. 11 is an exemplary report interface according to one embodiment of the invention.

FIG. 11 is an exemplary report interface according to one embodiment of the invention. The web page illustrated in FIG. 11 displays a chart itemizing information for an information provider. The web page illustrated in FIG. 11 corresponds to a priority fee paid for clicks on an information provider listing. The report illustrated in FIG. 11 enables an information provider to see how his/her priority fees have performed. The information provider can see how many clicks he has paid for, how many calls these clicks resulted in, how much he earned from those calls, etc. This guides him to set his ideal maximum priority fee, the level at which he will break even. He then knows that all the paid clicks he pays for below this maximum priority fee will result in profit.

Illustrative Example

Danielle is a therapist in Chicago, who increasingly has been using the Internet to attract more clients to her business. In fact, she has been listing herself at an online services marketplace where she can attract clients and deliver services.

She creates a listing at this online services marketplace, describing her therapy services, indicating the schools where she received her psychology degree, and including a photo of herself. She indicates that her fee is $1 per minute or a bulk rate of $50 per hour for therapy services delivered through the online marketplace.

After Danielle has finished her morning reading, she is ready to take clients, so she goes to the online marketplace and indicates that she is available to receive calls. She does this by clicking on the "Available" button on the website or by calling a phone number, such as a toll free number, and pressing a button on her telephone keypad. When she has indicated that she is presently available, the website automatically indicates to all perusing clients that her business is currently ready for instant services. Customers who view her listing can see an availability indicator, such as a green telephone, next to her photo, indicating that this therapist is ready to receive a call at $1 per minute at this very moment.

One such customer named Kevin, one of her regulars, goes to her listing page, which he has bookmarked using his Internet browser. Kevin sees that Danielle is available at this very moment. Wishing to speak with her, he clicks on the green telephone next to her photo. The online services marketplace calls him, and his telephone rings. The online services marketplace then calls Danielle on her telephone. It then connects Kevin to Danielle for a live phone call that is billed to Kevin at $1 minute and paid to Danielle's online account.

Upon a trigger event (e.g., when Kevin is called, when Danielle is called, when Kevin and Danielle are connected, etc.) and while they are talking on the phone, Danielle's listing no longer displays a green telephone indicating that she is Available to receive calls. Since she is busy, the symbol turns red, indicating that she is currently busy with another customer.

When Danielle is finished with Kevin's call, she hangs up. The symbol next to her photo on the website automatically switches back to a green phone, indicating that she is once again ready to receive calls.

Danielle waits for an hour, but no one else calls her. She therefore decides to promote her online business in the advertising area of the online services marketplace.

The entry form in the advertising area asks her how much she is willing to pay for a qualified customer to view her online listing. She figures that, of every ten new customers who view her online listing, one of them will call her and become a regular customer. She figures a regular customer is worth about $100 for her. To be conservative, she starts with a low bid, indicating that she'll pay a maximum $2.00 for a qualified customer to view her online listing. If ten such customers click on and view her listing, she'll pay a total of $20.00, and one of those customers will become a regular, providing her with a healthy profit.

Her maximum bid of $2.00 per click ensures that, if a customer clicks on her listing and views it, she'll pay a maximum of $2.00. She may actually pay less than $2.00 per click, since that is her maximum bid. For example, the online marketplace will only charge her one penny more than the bidder below her, who is a therapist named Buck. Buck is bidding $1.90 per click. Since Buck is bidding $1.90, then Danielle will be charged $1.91 if someone clicks upon her listing.

Danielle submits her maximum bid of $2.00 per click. Before accepting her bid, the online marketplace checks to see whether her business has a satisfactorily high feedback rating associated with it. Danielle's average feedback rating is 4.5 stars, which is more than the 3-star minimum. Danielle also has a photograph on her listing, which is another minimum requirement of the advertising section. Since all of the minimum criteria are met, Danielle's bid is accepted by the system.

Danielle's bid of $2.00 per click is the second highest in the therapy section. She therefore appears in the second position on the page of therapists, one position above Buck at number three and one position below Cindy, who is bidding $2.20 and is therefore in the number-one position.

A customer named John browses the online marketplace every week, looking for counselors. He clicks on Danielle's listing. Danielle's account therefore is charged $1.91, which is one penny more than the $1.90 maximum bid of the therapist name Buck, who is below her in the number-three position. John, after reading Danielle's feedback at her listing, decides not to call her.

Michelle is another customer at the online marketplace. She sees Danielle's listing in the number-two spot and clicks on it. Danielle is again charged $1.91. Michelle, however, decides to call Danielle. She clicks on her green telephone, and their phone call begins. Danielle's listing automatically no longer displays a green telephone that indicates she is Available, since she is now busy.

A customer named Grant visits the online marketplace, looking for a therapist. He browses the advertisements of therapists. He sees Cindy in the number one position, but he doesn't see Danielle below her. He instead sees Buck in the number two position. Buck is bidding $1.90 per click, which is less than Danielle's $2.00, but since Danielle is currently on a call with Michelle, she is no longer Available and so the online marketplace automatically removes her listing from the advertising section. This saves her a great deal of money. If the system hadn't automatically removed her, she would have been charged $1.91 when Grant clicked on her listing, even though Grant wouldn't have been able to call her at that moment.

Danielle finishes her phone call with Michelle. It was a ten-minute call, so she earned a total of ten dollars for this call. Since she hangs up the phone, she is once again Available to receive new customers. Her listing automatically displays her green telephone of Availability again. Her listing also automatically reappears in the advertising section.

When Danielle decides to go to lunch, she changes her availability status either with a phone or with through a browser to make herself "Not Available." Her listing no longer displays a green telephone of Availability. It instead displays a message, such as the words "Away—please come again later." Her listing is also automatically removed from the number-two spot in the advertising section since she is no longer Available, just like when she was busy with a call.

After lunch Danielle wants to see whether she's making a profit. She therefore visits the Reports section of the online marketplace. She sees that she was charged $1.91 due to a click from John. She was also charged $1.91 due to a click from Michelle. In total, she has been charged $3.82. However, she earned a total of $10.00 from her call with Michelle. Danielle therefore came out ahead $6.18 during the brief time she worked. The Reports section automatically calculates that Danielle could set her Maximum Bid higher than $2.00 per click and still be profitable. In fact, according to recent activity, Danielle's breakeven Maximum Bid would be $5.00. This bid would provide her with the maximum number of calls without her having to add outside money into the system. Danielle therefore raises her Maximum Bid to $5.00.

Danielle makes herself Available to receive calls once again. The green telephone appears on her listing. She reappears in the advertising section. This time she is in the number one spot, ahead of Cindy, who still has a Maximum Bid of $2.20.

Danielle's regular customer, Kevin, browses the advertising section. He sees Danielle's listing and clicks on it. However, since he is a regular customer of Danielle's, she is not charged for the click. The system automatically ignores his click because he is a regular customer, saving her money. Otherwise she would have been charged $2.21 for the click.

Another customer, Peter, clicks on Danielle's listing. She is charged $2.21 for the click. Maliciously, Peter clicks on Danielle's listing a total of twenty times, seeking to sabotage her business with multiple charges. However, the system only charges her for one click and ignores the other 19 clicks. In order to limit unfair charges, such as from malicious acts, the system automatically ignores multiple clicks from a single customer in each 24-hour period.

ALTERNATIVE EMBODIMENTS

While the invention has been described in terms of several embodiments, those skilled in the art will recognize that the invention is not limited to the embodiments described. For instance, while the flow diagrams show a particular order of operations performed by certain embodiments of the invention, it should be understood that such order is exemplary (e.g., alternative embodiments may perform the operations in a different order, combine certain operations, overlap certain operations, etc.).

Thus, the method and apparatus of the invention can be practiced with modification and alteration within the spirit and scope of the appended claims. The description is thus to be regarded as illustrative instead of limiting on the invention.

We claim:

1. A computer implemented method comprising:

receiving, by a computer and from an information provider, a first price bid for priority of presenting the information provider, and a second price to charge users for services of the information provider, the first price bid to be paid by the information provider for being prioritized in presentation in response to a qualified selection of the information provider from presentations prioritized at least based on the first price bid;

receiving from a user a first request for a type of information provider;

identifying a set of identified information providers that satisfy the first request;

prioritizing, using the computer, the set of identified information providers in accordance with at least the first price bid for priority of presenting the information provider and in accordance with availability of the set of identified information providers, to generate a prioritized set of information providers;

providing the prioritized set of information providers for presentation to the user;

receiving a second request from the user to select the information provider as a selected information provider from the prioritized set of information providers;

in response to the second request, providing a connection for real time communications between the user and the selected information provider;

in response to the second request determining whether to charge the selected information provider according to the first price bid based on determining whether the second request is a qualified selection; and monitoring a length of time of the connection, to charge the user according to the second price of the selected information provider.

2. The method of claim 1, wherein the receiving of the first request for a type of information provider includes receiving the first request in a form of at least one search term submitted by the user from a website interface; and the providing the prioritized set of information providers includes providing the prioritized set from a database of information providers.

3. The method of claim 1, wherein the set of identified information providers are further prioritized according to at least one of: rating, relevancy, experience, and the rate of consultation fee.

4. The method of claim 2, wherein the rating is based on at least one of: a peer rating, an independent auditor rating, and a user rating.

5. The method of claim 1, wherein the selected information provider is charged according to the first price bid upon being connected to the user for real time communications.

6. The method of claim 1 wherein the second request is determined to be a qualified selection only if the user has a credit account with an information provider search engine.

7. The method of claim 6, wherein the second request is subsequently determined to be a qualified selection after the user establishes a credit account with an information provider search engine within a predetermined period of time after selecting the selected information provider.

8. The method of claim 1 wherein the second request is determined to be not a qualified selection if the user had communication with the selected information provider within a predetermined period of time prior to the second request.

9. The method of claim 1 wherein the second request is determined to be not a qualified selection if the user had a predetermined number of qualified selections of information providers within a predetermined period of time prior to the second request.

10. The method of claim 1, wherein the second request is determined to be not a qualified selection if the user had a predetermined number of qualified selections of the selected information provider within a predetermined period of time prior to the second request.

11. The method of claim 1, wherein the identifying further includes selecting information providers that have a predetermined level of feedback.

12. The method of claim 1, wherein the identifying further includes selecting information providers that have a web page of a predetermined level of quality.

13. The method of claim 1, further comprising charging the set of identified information providers according to price bids of the set of identified information providers upon displaying the set of identified information providers.

14. The method of claim 1, wherein the prioritized set of information providers are displayed as web page links, each of the web page links being an address for detailed information describing an associated information provider.

15. The method of claim 1, wherein the providing the connection for real time communications comprises:

retrieving contact information from the user requesting the selected information provider;

contacting the selected information provider and the user separately;

connecting the user to the selected information provider while maintaining security of the retrieved contact information.

16. The method of claim 1, further comprising providing a user interface to the set of identified information providers for modifying and viewing price bids of the set of identified information providers.

17. A computer implemented method comprising:

receiving a request for a type of information provider;

retrieving information provider information that includes a price bid for priority of presenting an information provider, an availability status, and an information provider identifier for each of a set of identified information providers that satisfy the request, the price bid to be paid by the information provider in response to a qualified selection of the information provider selected from a presentation of the information provider prioritized according to the price bid;

prioritizing the information provider information according to the price bid and the availability status indicated for each of the set of identified information providers using a computer to generate a prioritized set of information provider information;

listing the prioritized set of information provider information on a web page that provides a user interface for initiation of real time communications with the set of identified information providers; and in response to a user selection of a selected information provider from the set of identified information providers, determining whether to charge the selected information provider the price bid based on whether the user selection is a qualified selection.

18. The method of claim 17, wherein the request for a type of information provider includes at least one search term entered into an information provider search engine.

19. The method of claim 17, further comprising:

receiving a selection for the selected information provider selected from the set of identified information providers listed on the web page;

retrieving contact information from the user requesting the selected information provider;

contacting the selected information provider and the user separately; and connecting the user to the selected information provider while maintaining security of the contact information retrieved from the user.

20. The method of claim 19, further comprising charging the selected information provider the bid price associated with the selected information provider after receiving the selection of the selected information provider.

21. A computer implemented method, comprising:

retrieving a set of information provider identifiers that satisfy a request for a type of information provider, the request being received from a user over the Internet;

ranking, by a computer, the set of information provider identifiers according to a price bid for priority of presenting an information provider and according to availability status;

generating at least one file to display the set of information provider identifiers;

transmitting the at least one file from the computer to the user;

in response to a user selection of the information provider as a selected information provider identified by one of the set of information provider identifiers, providing a connection for real time communications between the user and the selected information provider and determining whether the user selection is a qualified selection based on at least one pre-specified criterion; and charging the selected information provider according to the price bid for priority in the ranking of the set of information provider identifiers, in response to a determination that the user selection is a qualified selection.

22. The method of claim 21, wherein the set of information provider identifiers is a set of links to web pages corresponding to a set of identified information providers.

23. The method of claim 21 wherein the providing the connection for real time communications comprises:

retrieving contact information from the user; and contacting the selected information provider and the user separately to connect the user to the selected information provider.

24. A machine-readable medium having stored thereon a set of instructions, which when executed by a processor, cause the processor to perform operations comprising:

in response to receiving from a user a first request for a type of information provider, identifying a set of identified information providers that satisfy the first request;

prioritizing the set of identified information providers in accordance with at least a price bid and availability of the set of identified information providers to generate a prioritized set of information providers, the price bid to be paid by an information provider in response to a qualified selection of the information provider;

providing the prioritized set of information providers for display to the user;

providing a connection for real time communications between the user and a selected information provider selected from the prioritized set of information providers in response to a second request from the user;

in response to a user selection of the selected information provider from the prioritized set of information providers, determining whether to charge the selected information provider according to the price bid based on whether the user selection is a qualified selection; and monitoring a length of time of the connection, to charge the user according to a rate of the selected information provider.

25. A machine-readable medium having stored thereon a set of instructions, which when executed by a processor, cause the processor to perform operations comprising:

retrieving a set of information provider identifiers that satisfy a request for a type of information provider, the request being received from a user over the Internet;

ranking the set of information provider identifiers according to price bid and availability status;

generating at least one file to display the set of information provider identifiers;

transmitting the at least one file to the user;

in response to a user selection of a selected information provider identified by one of the set of information provider identifiers, providing a connection for real time communications between the user and the selected information provider and determining whether the user selection is a qualified selection based on at least one pre-specified criterion; and charging the selected information provider according to the price bid in response to a determination that the user selection is a qualified selection.

* * * * *